(12) United States Patent
Hammond

(10) Patent No.: US 8,127,566 B2
(45) Date of Patent: Mar. 6, 2012

(54) MULTIPLE AIRFLOW PATTERN WATER SOURCE GEOTHERMAL HEAT PUMP UNIT

(75) Inventor: Jay Allen Hammond, Fort Wayne, IN (US)

(73) Assignee: Geothermal Design Associates, Inc., Fort Wayne, IN (US)

( * ) Notice: Subject to any disclaimer, the term of this patent is extended or adjusted under 35 U.S.C. 154(b) by 431 days.

(21) Appl. No.: 12/493,953

(22) Filed: Jun. 29, 2009

(65) Prior Publication Data

US 2009/0321041 A1 Dec. 31, 2009

Related U.S. Application Data

(63) Continuation-in-part of application No. 11/648,380, filed on Dec. 29, 2006.

(51) Int. Cl.
*F25D 23/12* (2006.01)

(52) U.S. Cl. ........................................ 62/260; 62/324.1

(58) Field of Classification Search .................. 62/324.1, 62/260, 498, 160, 238.7; 165/45, 104.34, 165/59, 48.1
See application file for complete search history.

(56) References Cited

U.S. PATENT DOCUMENTS

| | | | |
|---|---|---|---|
| 6,345,511 B1 * | 2/2002 | Esty et al. | 62/259.1 |
| 6,519,970 B1 * | 2/2003 | Rafalovich et al. | 62/448 |
| 6,691,514 B2 * | 2/2004 | Bushey | 60/651 |
| 7,228,693 B2 * | 6/2007 | Helt | 62/176.6 |

* cited by examiner

*Primary Examiner* — Mohammad Ali
(74) *Attorney, Agent, or Firm* — Barnes & Thornburg LLP

(57) ABSTRACT

A modular water source geothermal heat pump unit is provided. The water source geothermal heat pump unit comprises separate fan, compressor and coil modules. In one embodiment, the compressor module may be located between the fan and coil modules. In another embodiment the water source geothermal heat pump unit may be a monolithic unit that includes a fan that directs air through a chute located adjacent a compressor. The chute may also be located between the fan and a coil.

2 Claims, 25 Drawing Sheets

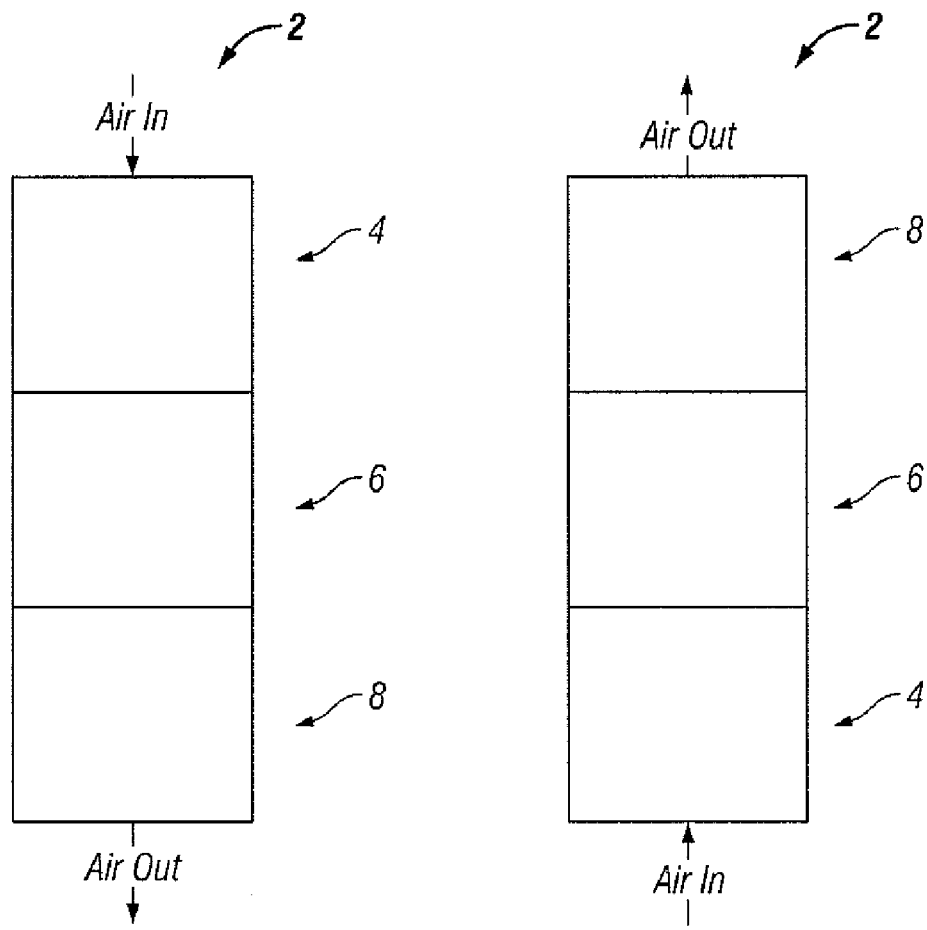

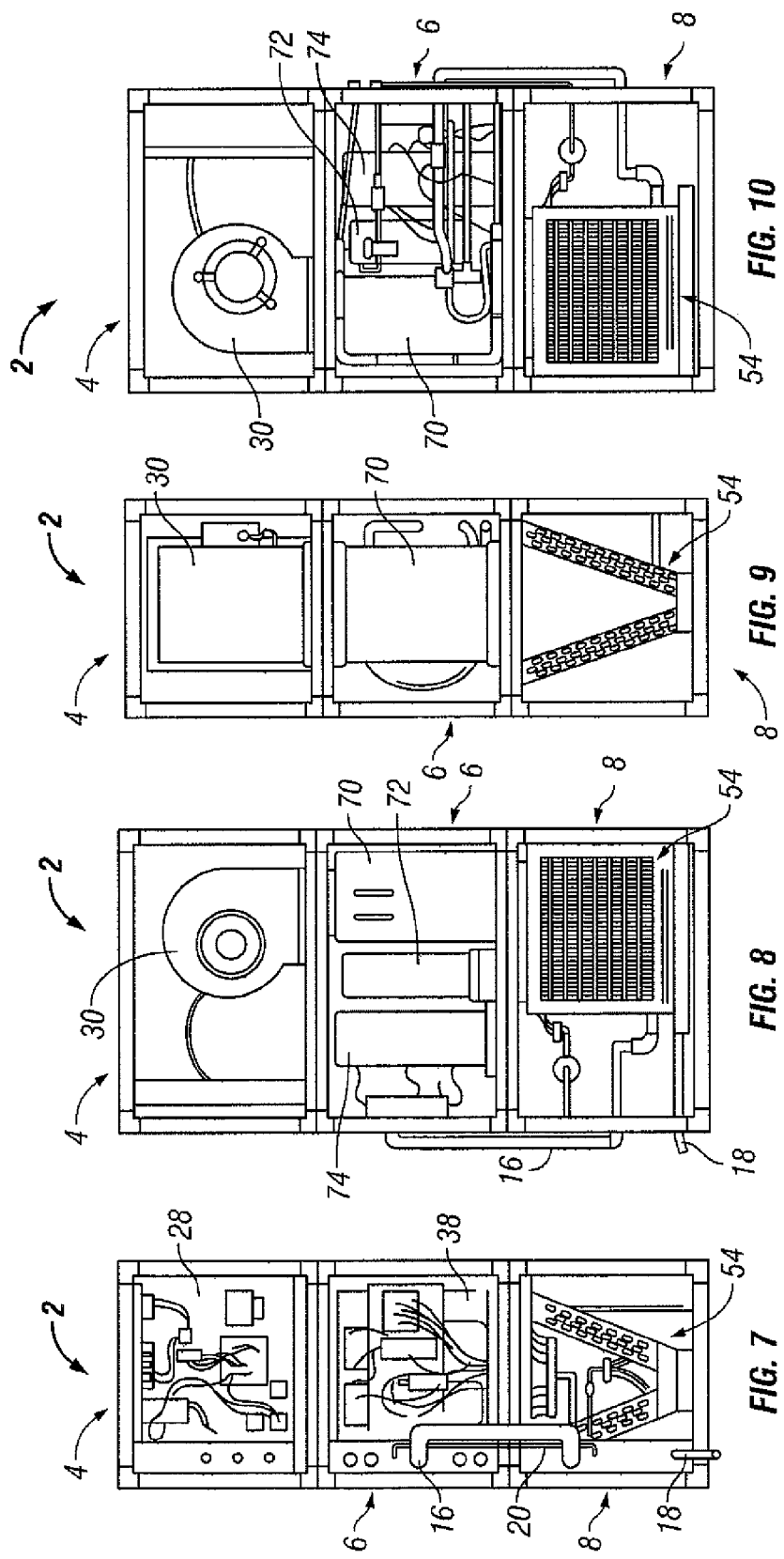

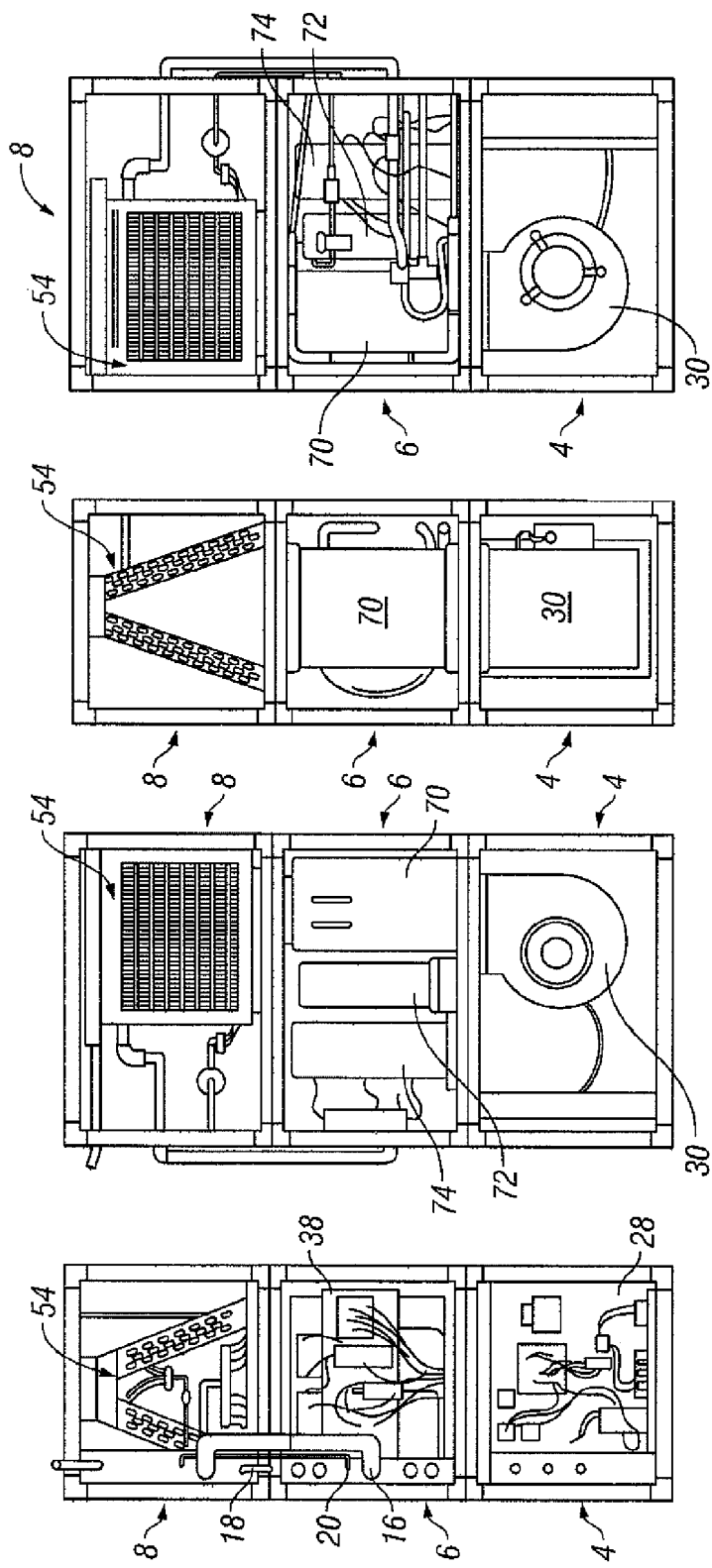

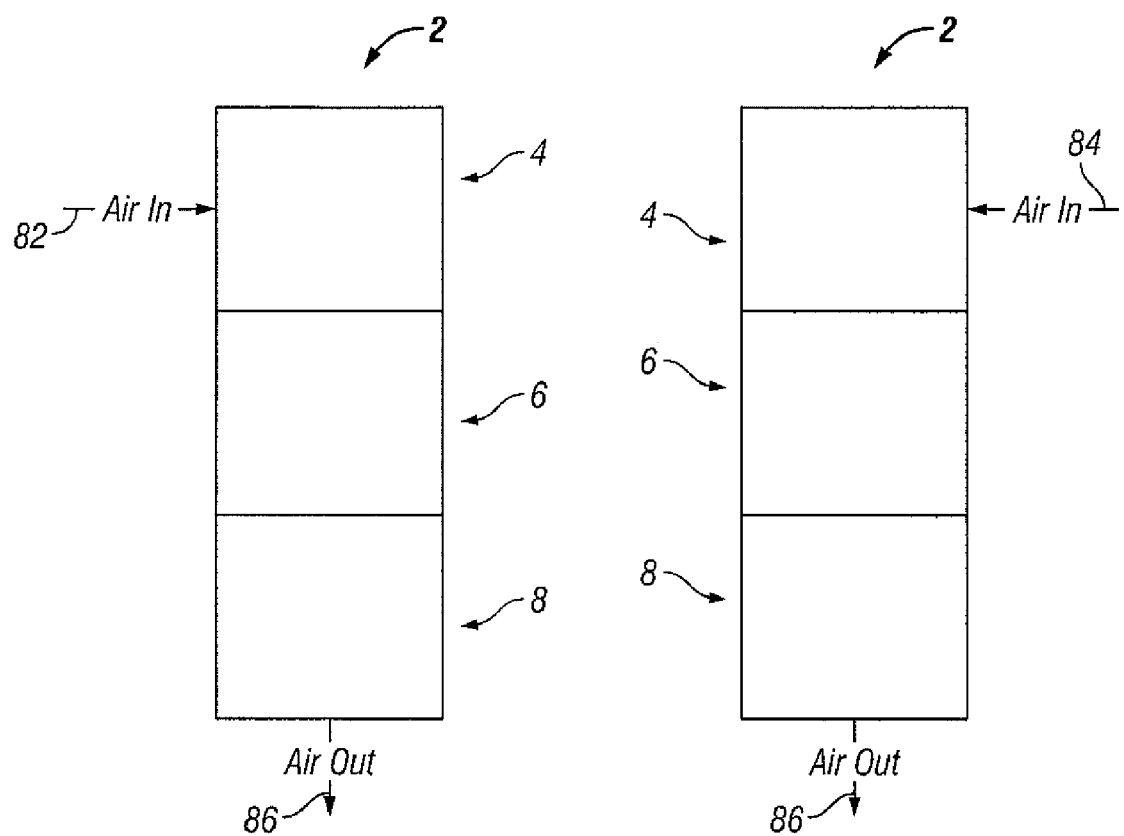

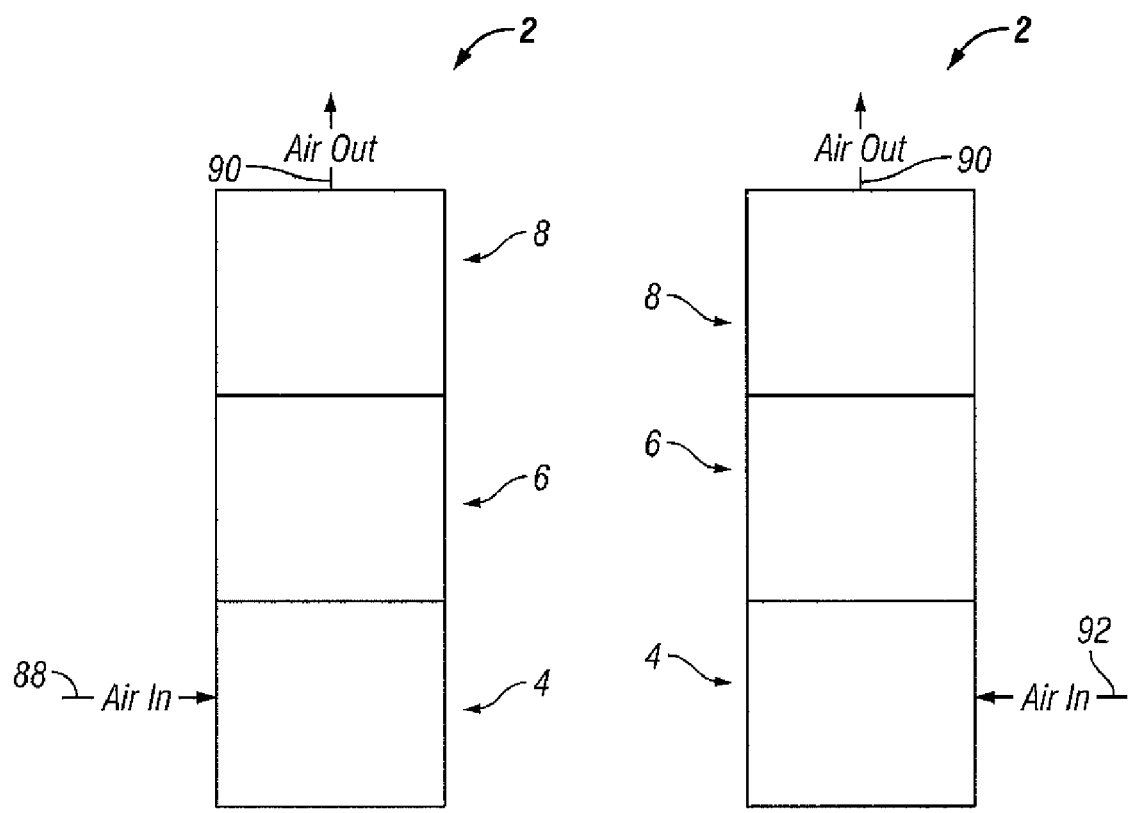
FIG. 20     FIG. 21

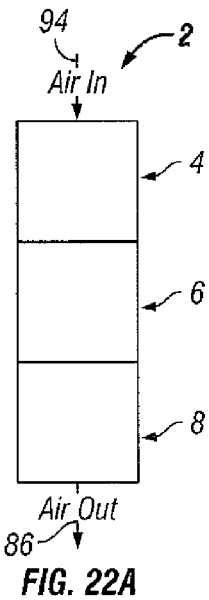
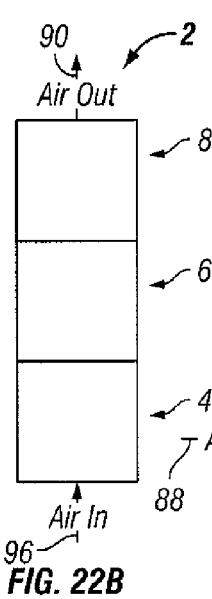
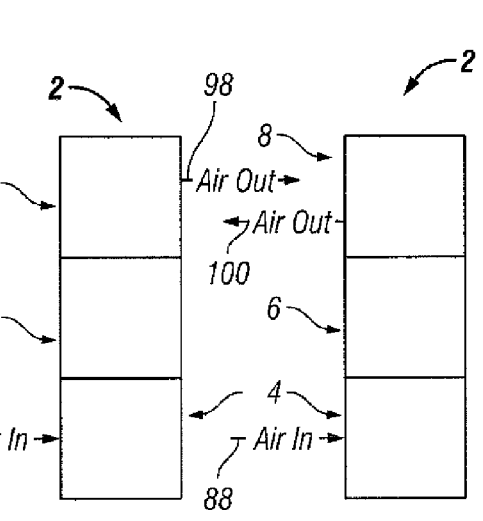
FIG. 22A   FIG. 22B   FIG. 22C   FIG. 22D
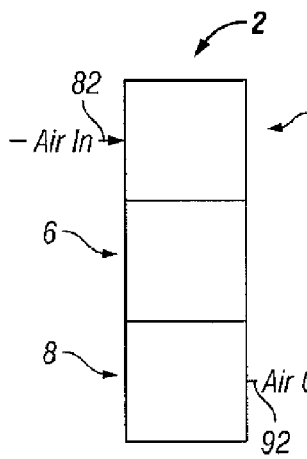
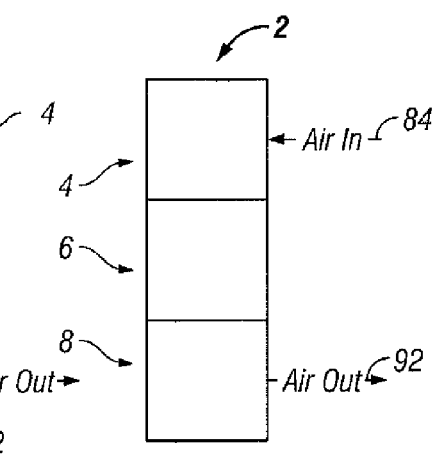
FIG. 22E   FIG. 22F
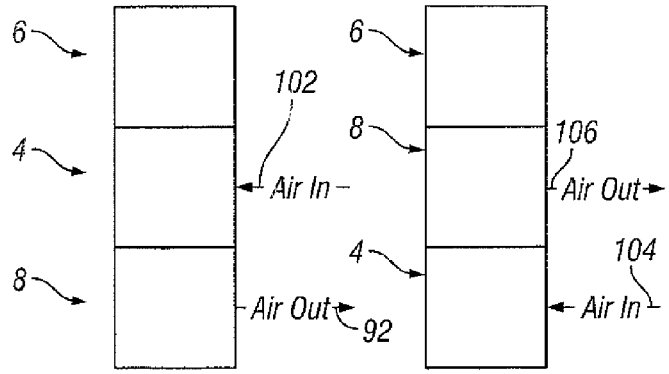
FIG. 22G   FIG. 22H

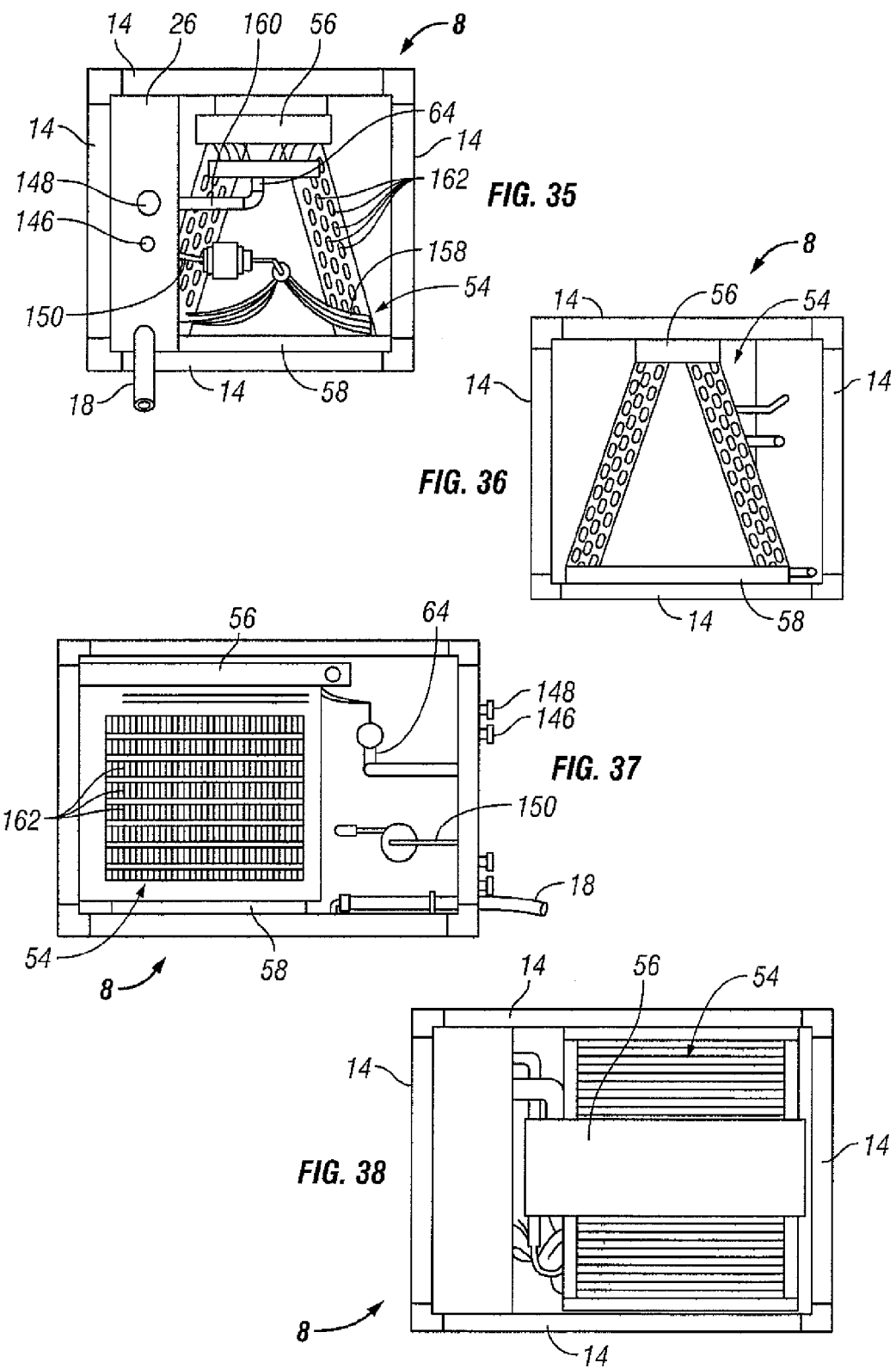

MULTIPLE AIRFLOW PATTERN WATER SOURCE GEOTHERMAL HEAT PUMP UNIT

RELATED APPLICATIONS

The present application is a Continuation-in-Part of U.S. patent application Ser. No. 11/648,380, filed on Dec. 29, 2006, entitled "Modular, Multiple Airflow Pattern Water Source Heat Pump." To the extent not included below, the subject matter disclosed in that application is hereby expressly incorporated into the present application by reference.

TECHNICAL FIELD

The present disclosure is related to geothermal heating and cooling units which are water source heat pumps that use the earth's internal ground temperatures or ground water to efficiently heat and cool homes and other structures. While this disclosure will refer to geothermal heat pump units, the same technology can be used in water source heat pump units using heating and cooling sources other than ground or ground water temperatures.

BACKGROUND AND SUMMARY

In the age of ever increasing environmental awareness, combined with the increasing cost of fossil fuels, geothermal heating and cooling systems are becoming the HVAC system of choice for new homes or structures, as well as for the replacement of existing systems.

Geothermal systems comprise a water source heat pump for heating and cooling. A basic heat pump works on the principle of moving heat from one place to another, hence the name. In the case of a geothermal heat pump, ground water or a liquid which is circulated through a series of pipes installed in the ground, lake, or pond is pumped through a heat exchanger in the geothermal heat pump, transferring energy to a refrigerant. The refrigerant absorbs energy from the fluid and changes state from a liquid to a gas. The refrigerant gas is pressurized by a compressor creating a higher temperature, which is then circulated through a coil via a fan, and ducts distribute the heat to the home or structure. For cooling, the process is reversed; excess heat is drawn from the home or structure, ejected to the ground water or ground loop via the geothermal heat pump.

Consequently, a myriad of components are necessary to run these cycles, and these components take up a lot of space. A geothermal unit is quite different from a typical furnace that simply heats air via burning fuel such as propane or natural gas. A benefit of the gas furnace, however, is that it requires less space. Moreover, the air conditioning portion of a conventional home HVAC system is a separate unit located outside. The result is that most conventional HVAC systems can be installed in relatively confined mechanical rooms. Although furnace size can differ, as a point of reference for illustrative purposes, a conventional home furnace measures about 18 to 22 inches wide by 28 to 29 inches deep, and 42 to 48 inches high. In contrast, a typical home geothermal unit is illustratively 22 to 26 inches wide, plus an additional 12 inches for ductwork, 24 to 32 inches deep, and 38 to 50 inches high. As a consequence, unless the mechanical room happens to have ample space, retrofitting a geothermal unit in a space previously occupied by a gas furnace can be difficult and often impossible. This can weigh heavily on an existing home's ability to become more energy efficient and environmentally friendly.

Setting aside furnace retrofits, another issue with geothermal units is their inability to adapt to certain duct inlet and outlet locations. For example, the configuration of the home or other structure may require an inlet return air duct attach to the side of the geothermal unit, whereas the outlet duct attach at the top. In other instances, the inlet may be on the side, and the outlet on the bottom. A consequence of this is that many different configurations of geothermal units need to be manufactured and stocked to accommodate the wide variety of inlet and outlet possibilities. Current manufacturers and distributors must stock a multitude of water source heat pumps in various capacities and at least 5 different airflow configurations in each capacity. These air flow configurations include a left return top outlet system, a right return top outlet system, a left return bottom outlet system, a right return bottom outlet system, and occasionally a "split" system where the air handling section is separate from the compressor/heat exchanger section. Needless to say, this translates into increased manufacturing and distribution costs.

A large number of furnaces and air handlers are also installed in closets in the interior of a home or structure. If currently manufactured geothermal heat pumps are to be installed in a closet, air must enter from the left or right side. In many cases, there is not enough room in the closet to install the system. Furthermore, geothermal units do not have straight vertical pass-through capabilities. Many conventional heating and cooling systems are based on a "straight through" airflow configuration, where return air enters the unit from the top or bottom of the unit and exits through the opposite end. In other words, intake air will go straight through the system. This hampers the variety of duct inlet and outlet positions capable of accepting the geothermal heat pump. This also exacerbates the potential for use as a furnace retrofit, since many furnaces have such a capability.

In contrast, an illustrative modular water source geothermal heat pump of the present disclosure requires less space, reduces manufacturing and distribution costs, and is less difficult to install versus existing conventional left or right air intake/top or bottom outlet style geothermal heat pumps. Illustratively, this new modular water source geothermal heat pump assembly comprises separate components each connectable in various configurations that varies the locations of the air intakes and outlets, otherwise not found in conventional geothermal heat pump units. An embodiment of the assembly comprises independent fan, compressor, and coil modules. The fan module includes the air intake that provides air to the other modules. This fan module can be oriented in a variety of ways thereby positioning the air intake in a variety of locations to accommodate the requirements of the mechanical room and ductwork configurations. The compressor module creates heated or chilled refrigerant. The compressor module also includes a pass-through so moving air from the fan module can pass through to another module. The coil module receives the heated or chilled refrigerant through a coil that is exposed to the moving air from the fan module. Thermodynamic heat transfers between the coil and the moving the air, heating or cooling which exits the coil module into duct work.

In an illustrative embodiment, the compressor module can be positioned in a variety of locations relative to the fan module to accommodate the needs of the mechanical room and the coil module. For example, the compressor module can be located at the side of the fan module, above it, or below it. The compressor module creates heated or chilled refrigerant, and air supply ducting connects to the fan module allowing air from the fan module to pass through into the compressor module.

The coil module receives flowing air from the fan module, and heated or chilled refrigerant from the compressor module. The refrigerant is directed into a coil in the fan module and the air passes through that coil and exits through an outlet and into the ducting. The coil module is configurable so that the outlet can be positioned at the top or sides of the module as needed.

Modularization allows additional permutations of connecting the modules together. For example, another embodiment connects the fan and coil modules together directly and the compressor module is spaced apart, i.e., a "split system." The separated compressor module is tethered using tubing directing the heated or chilled refrigerant to the coil. This arrangement allows further flexibility in how the water source geothermal heat pump assembly is customized for the particular purpose. Another illustrative embodiment includes a monolithic heat pump unit that includes the fan/compressor/coil components inside a single unit.

According to an embodiment of the present disclosure, a modular water source geothermal heat pump unit is provided. The water source geothermal heat pump unit comprises a fan module, a compressor module, and a coil module. The compressor module is located between the fan and coil modules. The fan module also has an air inlet and the coil module also has an air outlet.

The above and other illustrative embodiments of the water source geothermal heat pump unit may further comprise: the fan module being separable from the compressor module which is separable from the coil module; the fan module including a fan that moves air out of the fan module and into a chute in the compressor module; air in the compressor module exits and enters the coil module which further comprises a coil, wherein the air passes through the coil and exits the outlet; the compressor module further comprising a compressor which creates heated or chilled refrigerant, and wherein the heated or chilled refrigerant being distributed to the coil in the coil module; each of the modules being selectively separable from one another and reconnectable in a different configuration; and each module further comprising a separate flooring.

Another illustrative embodiment of the water source geothermal heat pump unit comprises an enclosure having a first opening configured to receive air. There is also a second opening axially opposed to and distal from the first opening to exhaust the air. A fan located adjacent the first opening. The fan draws air and moves it from the first opening, and directs it toward the second opening. A compressor creates heated or chilled refrigerant. A coil is located adjacent the second opening. A chute is located adjacent the compressor and between the fan and the coil. The coil is configured to receive and circulate the heat or chilled refrigerant from the compressor. The moving air from the fan passes through the chute, through the coil, and exhausts from the second opening.

The above and other illustrative embodiments of the water source geothermal heat pump unit may further comprise: the coil being an A-frame coil; and the compressor being located between the fan and the coil.

Another illustrative embodiment of the water source geothermal heat pump unit comprises a fan module comprising a housing and a fan having a fan outlet. The fan outlet is located on the housing's periphery such that air can be moved exterior of the fan module. A compressor module is in communication with the fan module such that air exiting the fan module enters and exits the compressor module. A coil module is in communication with the compressor module wherein air from the compressor module enters the coil module, passes a coil, and then exits through an opening in the coil module.

The above and other illustrative embodiments of the geothermal heat pump unit may further comprise: each module being separable from each other; each module comprising a floor portion and ceiling portion; the coil being an A-frame coil; the fan module having an air inlet, and the coil module has an air outlet that is opposed to the air inlet; the fan module comprising a plurality of cover panels that are each removable, wherein the fan module being configured to receive an air inlet at any one of its sides; and the coil module comprising a plurality cover panels that are each removable, wherein the coil module is configured to receive an air outlet on any one of its sides, or its top.

Additional features and advantages of the various embodiments of the water source geothermal heat pump units will become apparent to those skilled in the art upon consideration of the following detailed description of the illustrated embodiment exemplifying the best mode of carrying out the several embodiments heat pump as presently perceived.

Further, the purpose of the foregoing abstract, background, and summary is to enable the U.S. Patent and Trademark Office, those skilled in the art, and the public at large (including those whom are not familiar with patent or legal terms or phraseology or necessarily versed in the relevant art) to determine from a cursory inspection the nature of the subject matter in this disclosure. Neither the abstract, background, or summary limits the scope of any claimed invention. Rather, this is measured by the claims.

BRIEF DESCRIPTION OF DRAWINGS

The present disclosure will be described hereafter with reference to the attached drawings which are given as non-limiting examples only, in which:

FIGS. 5 and 6 are schematic views of an illustrative embodiment of a water source geothermal heat pump showing the directional flow of air;

FIGS. 7-10 are elevation views of an illustrative embodiment of a water source geothermal heat pump from different sides of the unit;

FIGS. 11-14 are elevation views of another configuration of a water source geothermal heat pump from different sides of the unit;

FIGS. 18-22 show a variety of schematic views of modular water source geothermal heat pump units in various configurations that affect the directional flow of air;

FIGS. 35-37 are elevation views showing three sides of a coil module;

FIG. 38 is a top view of the coil module;

Figure 1:
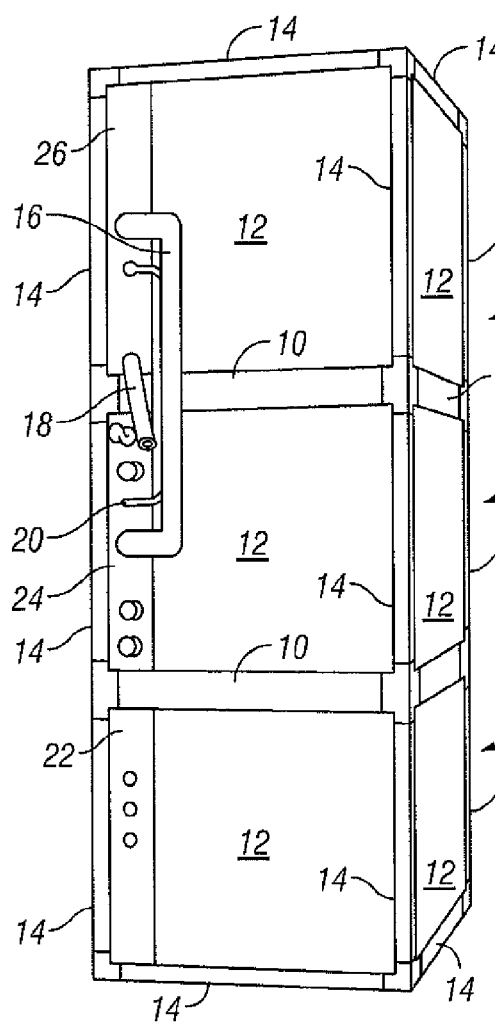
FIG. 1 is a perspective view of an illustrative embodiment of a water source geothermal heat pump assembly.

Corresponding reference characters indicate corresponding parts throughout the several views. The exemplification set out herein illustrates embodiments of the water source geothermal heat pump, and such exemplification is not to be construed as limiting the scope of the water source geothermal heat pump in any manner.

DISCLOSURE OF ILLUSTRATIVE EMBODIMENTS

Figure 2:
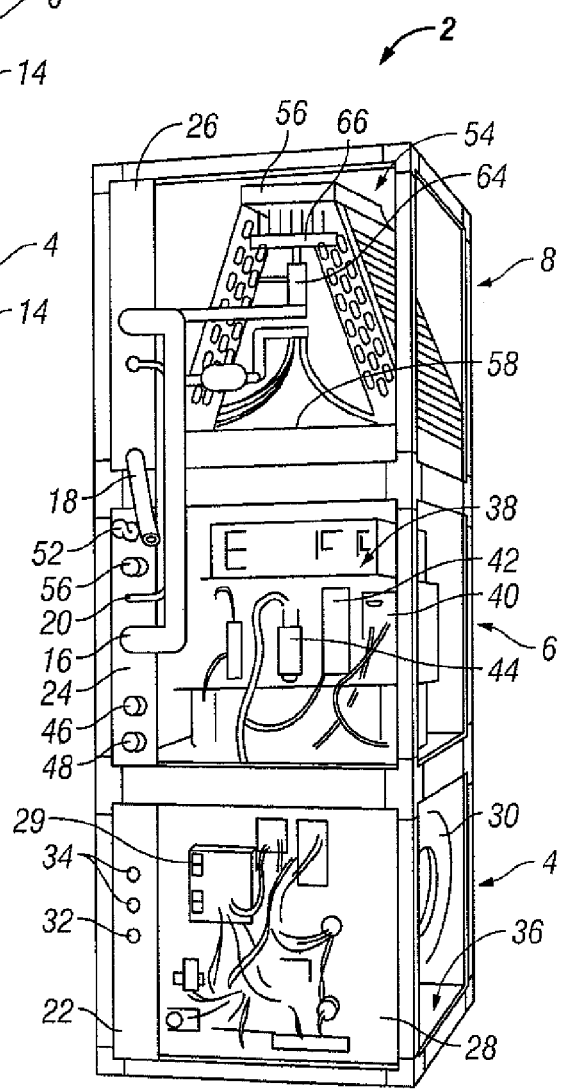
FIG. 2 is a perspective view of the water source geothermal heat pump of FIG. 1 with cover panels removed.

A perspective view of an illustrative embodiment of a modular water source geothermal heat pump 2 is shown in FIG. 1. This view shows how separate fan 4, compressor 6, and coil 8 modules can be combined to form water source geothermal heat pump unit 2. In this illustrative embodiment, brackets 10 can be used to couple modules 4, 6, and 8 together. In one illustrative embodiment, panels 12 can be used to shroud the interior components of unit 2. Face panels 12 are illustratively located between frame members 14 which provide structural integrity of heat pump 2. (See also FIG. 2.) It is appreciated that in other embodiments the heat pump can be a monolithic unit not requiring brackets 10, small face panels 12, or framing 14 while having the same configuration of the internal components as shown in FIG. 2. (See, e.g., FIGS. 47 and 48.)

As shown herein, refrigeration line 16 carries expanded refrigerant gas from air coil to compressor suction port. Condensate pipe 18 drains condensate collected in trays 56 or 58. Refrigeration line 20, equalizes liquid refrigerant gas across coil 54. Fan bulkheads 22, 24, and 26 support the external supply ports for power and refrigerant.

Another perspective view of modular water source geothermal heat pump 2 is shown in FIG. 2. This view has face panels 12 removed to show the interior contents. Fan module 4 shows fan controls 28 and fan blower 30. Illustratively controls 28 can also include an optional auxiliary electric heater controls 29 which activates an electric heater for providing auxiliary heat when necessary. Bulkhead 22 illustratively includes a low voltage port 32 and electrical ports 34 to supply power to module 4. It is appreciated that the interior surface or surfaces of fan module 4 may be lined with insulation such as foil insulation 36 illustratively shown. It is appreciated that air enters this module and then is pushed up through compressor module 6. This view also shows modules 4, 6, and 8 being coupled together with brackets 10. It is appreciated in illustrative embodiments that the attachments between the modules can be made either permanently or selectively using a variety of different means including, but not limited to, fasteners extending through modules, clips, panels, adhesives, welding, and clasps.

Compressor module 6, also shown in FIG. 2, includes compressor control panel 38 that illustratively comprises a low voltage circuit board 40, compacitor 42, contactor 44, and compressor section bulkhead 24. In bulkhead 24 are liquid-to-refrigerant heat exchanger outlet 46, optional domestic hot water inlet 48, refrigeration lines 16 and 20, ground water or loop liquid inlet 50, and optional domestic hot water outlet 52. Compressor section 6 illustratively attaches to coil section 8 via brackets 10. Brackets 10 are designed to provide horizontal continuity to configured components 4, 6, and 8 while providing a seal to prevent air to infiltrate between said modules.

Coil module 8 includes an illustrative A-frame coil 54 located between condensate downflow tray 56 and a condensate upflow tray 58. Refrigeration lines 16 and 20 extend into bulkhead 26. Condensate pipe 18 also extends from bulkhead 26 and is configured to drain condensate collected in trays 56 and 58. A refrigerant manifold 64 is in communication with refrigerant line 16. A refrigerant distributor 66 is in communication with refrigerant line 20 equalizing liquid refrigerant across the A-frame coil 54. In an illustrative embodiment, a condensate overflow switch is positioned adjacent either one of the overflow trays 56 or 58 depending on the orientation of the coil to detect excess levels of condensate in the pan(s).

Figure 3:
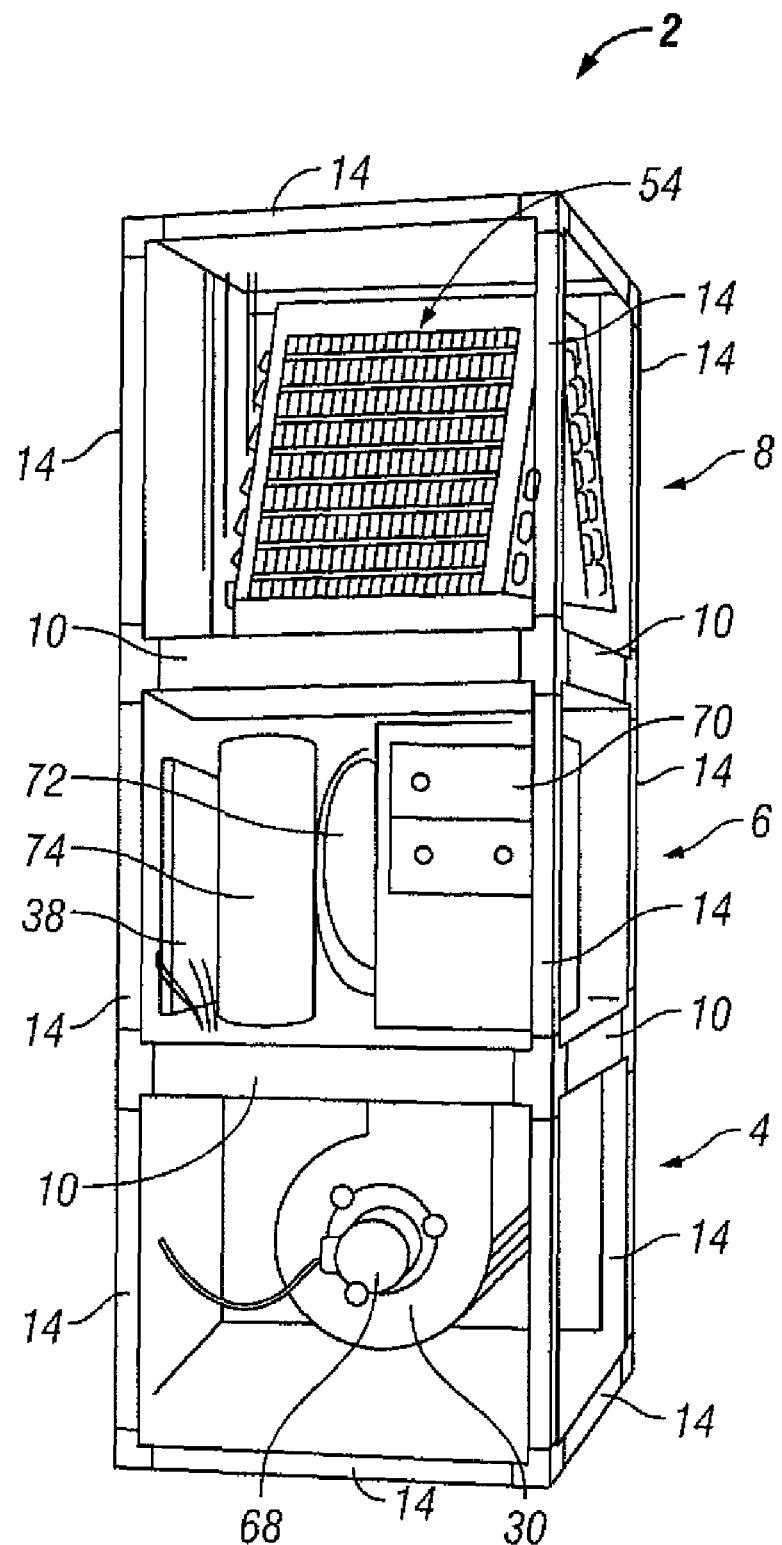
FIG. 3 is another perspective view of the water source geothermal heat pump of FIG. 1 shown at a different angle.

Another perspective view of water source geothermal heat pump 2 is shown in FIG. 3. This view depicts fan 68 attached to blower wheel 30 and fan module 4. Also shown is chute 70 that facilitates airflow between fan and coil modules 4 and 8. There is also a liquid-to-refrigerant heat exchanger 72 positioned illustratively adjacent chute 70. A refrigerant compressor 74 is illustratively located between the liquid-to-refrigerant heat exchanger 72 and compressor control panel 38. Coil module 8 shows another view of the illustrative embodiment of A-frame coil 54. As shown herein, the A-frame is a useful configuration because it allows a larger surface area than straight coils in a relatively compact space.

Figure 4:
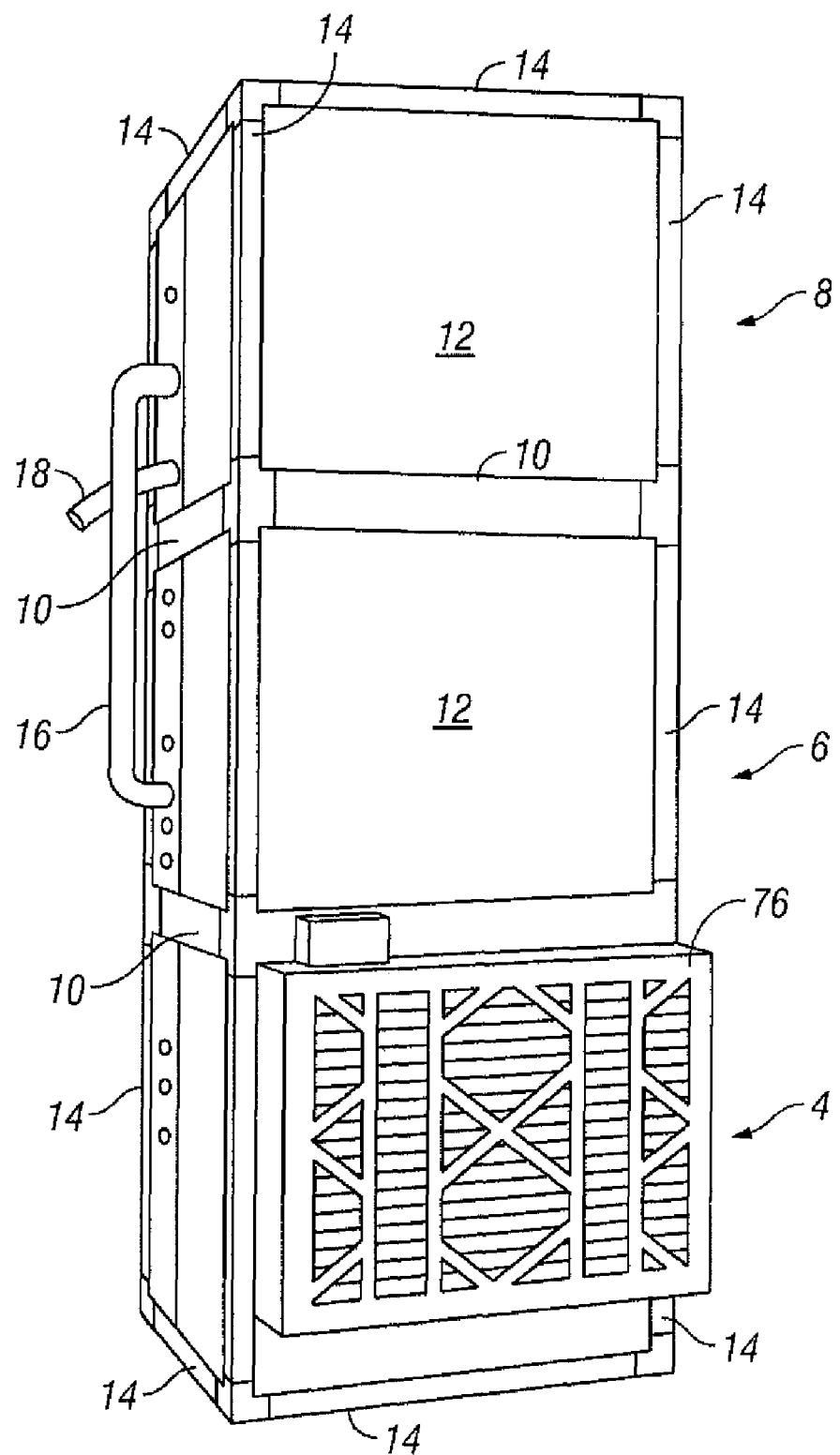
FIG. 4 is another perspective view of the illustrative embodiment of the water source geothermal heat pump of FIG. 1 from another angle.

Another perspective view of modular water source geothermal heat pump 2 is shown in FIG. 4. This view shows air filter 76 attached to fan module 4. As air enters module 4, it illustratively passes through filter 76 to be cleaned. It is appreciated, however, that the inherent flexibility of these modules allows filter 76 to be located on almost any side or exterior surface of module 4.

Schematic views of water source geothermal heat pump 2 in different configurations are shown in FIGS. 5 and 6. Using water source geothermal heat pumps to retrofit an existing structure is often not possible because of their sheer size and lack of air inlet and outlet options. In contrast, the disclosed modular fan compressor and coil sections 4, 6, and 8 create a water source geothermal heat pump 2 that is smaller sized to actually fit in the same 22 inches by 30 inches space as a standard gas furnace. This unit allows such retrofit options.

To accommodate this retrofit possibility, modules 4, 6, and 8, can be rearranged as needed and discussed further herein. For example, in certain circumstances air is needed to enter at the top and exit at the bottom, whereas in other instances air may need to enter from the bottom and exit from the top. As shown in FIGS. 5 and 6, modules 4, 6, and 8 are configurable to accommodate either orientation. As shown in FIG. 5, fan module 4 is located on top to accept air from the top. Compressor module 6 is located adjacent modules 4 and 8 in the middle. Chute 70 allows air to pass from fan module 4 to coil module 8 and then out of the unit. Conversely, as shown in FIG. 6, similar to the arrangement shown in FIG. 2, air is drawn from the bottom and through fan module 4 and compressor module 6, finally exiting through coil module 8. As discussed further herein, the exits and entrances of air flow portions of each of these modules are standardized so they can be oriented in a variety of different configurations based on the needs in the particular mechanical room or space where they will be installed and/or retrofitted from a gas based furnace.

Elevational views of heat pump 2 taken from different orientations with the fan module 4 on top, compressor module 6 in the middle, and coil module 8 on the bottom are shown in FIGS. 7-10. The makeup of the individual modules are the same as those described in FIGS. 1-6, in FIGS. 7-10 however, the modules are stacked in a different configuration. Here refrigerant line 16 extends between the upper compressor module 6 and the lower coil module 8, rather than the lower compressor module 6 and upper coil module 8 shown in the prior embodiments. Liquid-to-refrigerant heat exchanger 72 and refrigerant compressor 74 are, nevertheless, oriented the same as the prior embodiment. This downflow version fan 30 directs air downward through chute 70, in compressor module 6 and into the A-frame coil 54 of coil module 8. The views in FIGS. 9 and 10 further depict how the downflow arrangement can be employed while being the same modules previously arranged in the upflow arrangement per the prior embodiment.

As a point of comparison, FIGS. 11-14 show unit 2 in the upflow configuration similar to unit 2 from FIGS. 1-6, but in the same views as shown in FIGS. 7-10. Consistent with FIGS. 1-6, coil module 8 is located above compressor module 6 with fan module 4 on the bottom. Air flow enters fan 30 at the bottom, moves through chute 70, and then up across coil 54 toward the exit. Liquid-to-refrigerant heat exchanger 72 and refrigerant compressor 74 remain next to chute 70 in module 6 and refrigerant line 16 runs from compressor section 6 to coil 54 in module 8.

Figure 15:
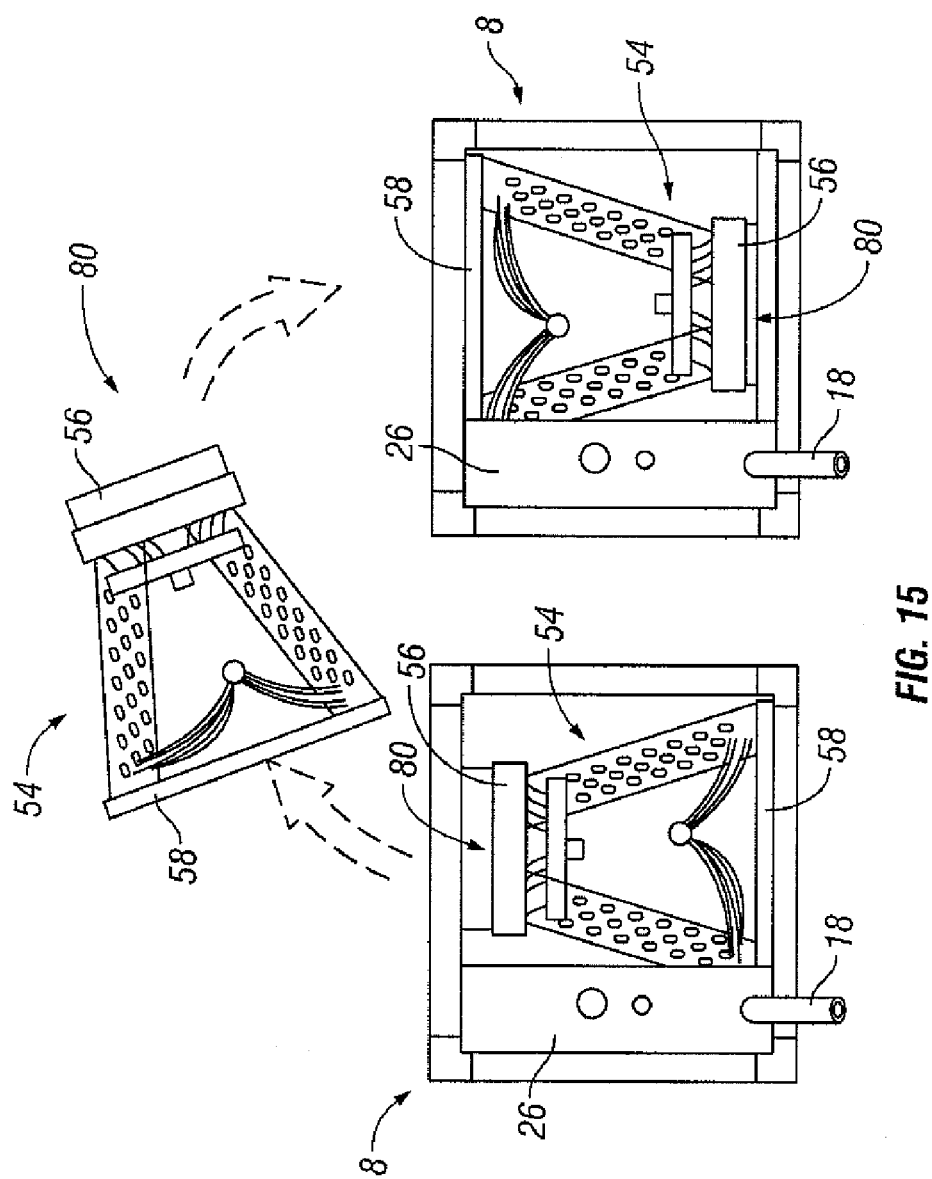
FIG. 15 is illustrative elevation views of a coil module demonstrating the adjustability of the coil assembly.

A progressive side elevation view of module 8 is shown in FIG. 15. This view depicts the ability of A-frame coil 54 to change its orientation depending on whether module 8 will be in an upflow or downflow configuration. When apogee 80 of coil 54 is directed upwards, it can be used in an upflow configuration. Illustratively, apogee 80 is pointed in the direction of the airflow. As is particularly useful by employing an A-frame design for coil 54, as air is flowing from fan 30 and up through compressor section 6, air is able to contact a greater surface area of coil 54 then would otherwise be available with a linear or slanted coil. This view also demonstrates the relative ease it is to convert the same coil module 8 between upflow and downflow configurations. This has an advantage of allowing a single coil module to be built, that is modifiable as needed into either the upflow or downflow configurations during installation or by a distributor or seller.

Figure 16:
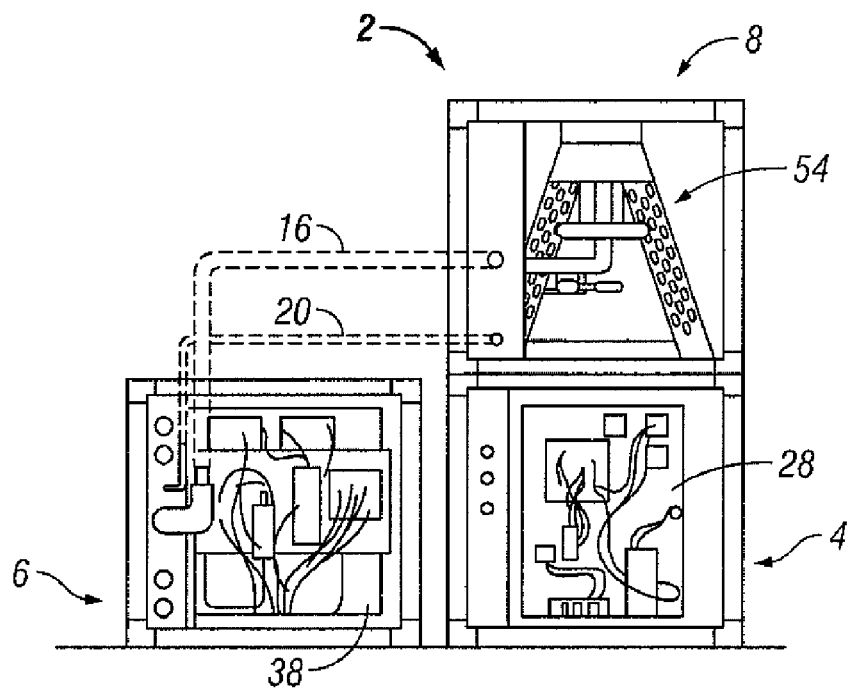
FIGS. 16 and 17 are side elevation views of alternate configurations of the water source geothermal heat pump modules.
Figure 17:
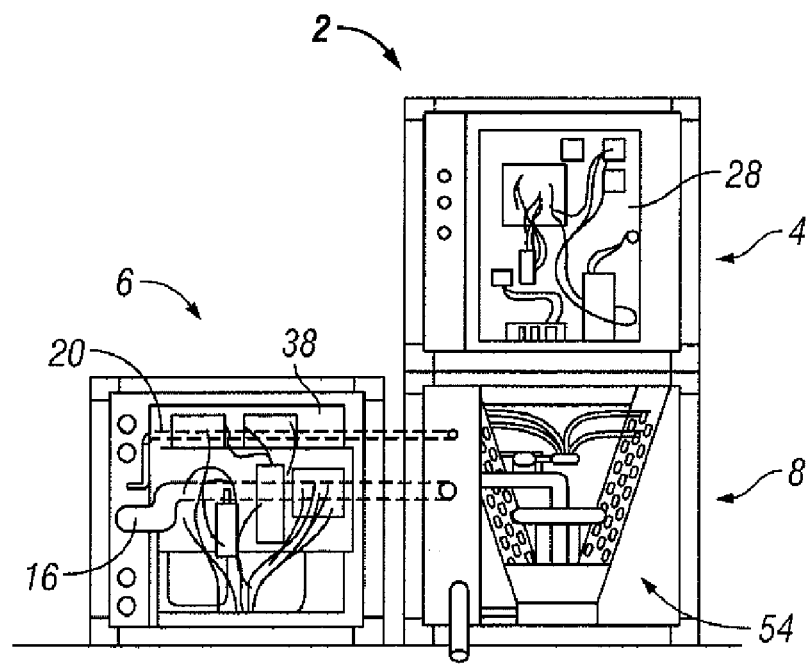
Figure 23:
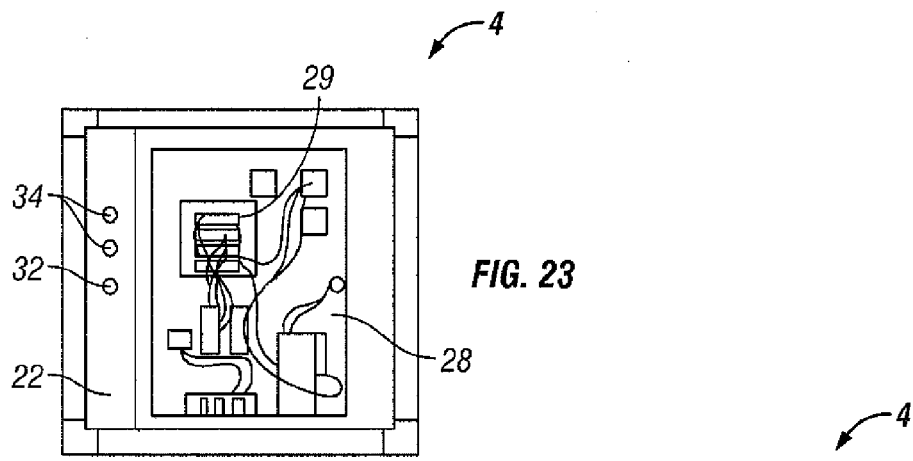
FIGS. 23-26 are elevation views showing the four sides of an illustrative embodiment of a fan module.

The side elevation views of FIGS. 16 and 17 demonstrate yet another configuration of modules 4, 6, and 8. This embodiment shows upflow and downflow configurations with coil module 8 directly connected to fan module 4. As shown for example in FIG. 16, fan module 4 is on the bottom and directly blows air up and into coil 54 of coil module 8. Compressor module 6 is located spaced apart from modules 4 and 8 and is connected through extended refrigerant lines 16 and 20. It is appreciated that the location of compressor module 6 can vary. Compressor module 6 can illustratively be positioned adjacent modules 4 and 8. Conversely, compressor module 6 may be located a substantial distance from modules 4 and 8. It is simply necessary to size the refrigerant lines 16 and 20 to effectively exchange the refrigerant between the modules according to methods known by those skilled in the art. The downflow configuration shown in FIG. 17 includes fan module 4 sitting on top of coil module 8 with the apogee 80 of coil 54 oriented downward in the direction of the airflow. Again, module 6 is separated from the two with only refrigerant lines 16 and 20 as the only connection between modules 6 and 8.

FIGS. 18 through 22 are schematic representations of modules 4, 6, and 8 positioned in the several potential configurations. As previously discussed, the flexibility in these configurations is necessary to accommodate the particular space and ductwork requirements for a particular installation. As shown in FIG. 18, for example, fan module 4 is located at the top with air configured to enter through the left side indicated by reference numeral 82. That air will then pass through compressor module 6 as previously discussed, and into coil module 8 where it exits out the bottom. This unit will accommodate ductwork that has the air intake at the top and air outlet at the bottom. In another illustrative embodiment, as shown in FIG. 19, although fan module 4 is still located on the top, air can enter that module from the right side indicated by reference numeral 84. In this configuration, similar to that shown in FIG. 18, air is passed through compressor module 6 and down through module 8 and out through the bottom indicated by reference numeral 86. This embodiment is obviously intended to accommodate furnaces requiring the output air be sent through the bottom and the air intake on the right side.

The schematic views of FIGS. 20 and 21 show an opposite configuration with module 4 on the bottom, module 6 in the center, and module 8 on top. As shown in FIG. 20, air intake 88 is at the bottom left side going into fan module 4 which directs the air up through module 6 and module 8 where it is expelled out through the top at 90. Again, this is to accommodate a particular requirement for installation. In this case it is a left intake ductwork with a top out ductwork configuration. The view of FIG. 21 is similar except air intake 92 is on the right side.

The several schematic views shown in FIG. 22 demonstrate additional configurations of water source geothermal heat pump modules 2, 6, and 8 to accommodate potential installation requirements. As shown in FIG. 22a, air intake 94 is at the top of fan module 4 where air passes through modules 6 and 8 and exits at the bottom at 86. Conversely, as shown in FIG. 22b, the air intake is now coming up from the bottom at 96 through module 4, then 6, and lastly 8 exiting at the top at 90. The configurations shown in FIGS. 22c and d include the air intake 88 entering from the right side of module 4 up through module 6 and out either the right side or left side of module 8, at 99, 100 and 98, 100, respectively. The views shown in FIGS. 22e and f show air intakes 82 and 84 entering the left and right sides of module 4 respectively, with air in both instances exiting coil module 8 at 92. Lastly, the configuration shown in FIGS. 22g and h include air intakes 102 and 104, respectively, and out through coil module 8 at 92 and 106, respectively. These views show that it is not necessary to always stack modules 4, 6, and 8 in a tandem arrangement in numerical order.

Figure 24:
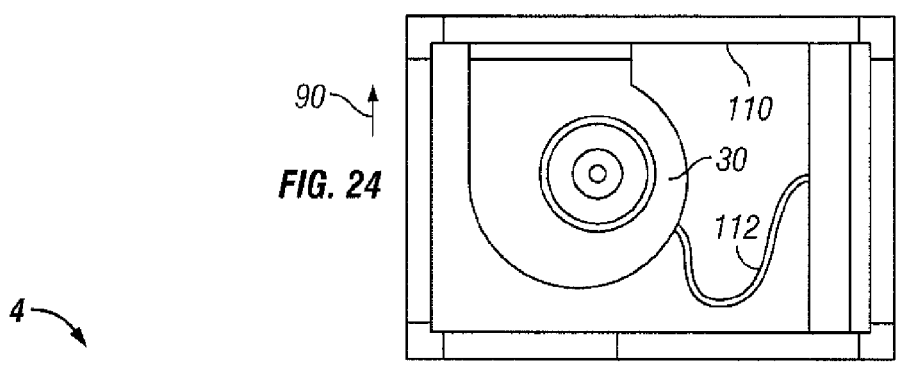
Figure 25:
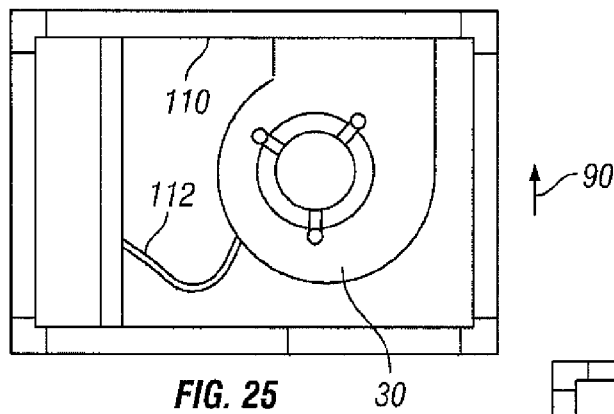
Figure 26:
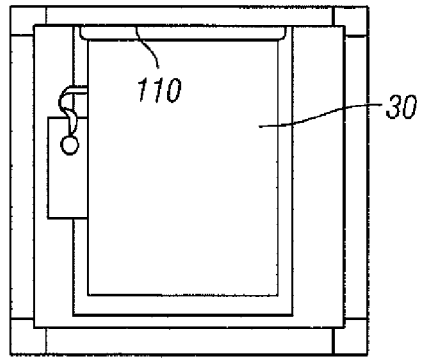

Elevation views showing the four sides of fan module 4 are shown in FIGS. 23-26. As shown in the elevation view of FIG. 23, fan module 4 includes fan control 28 which houses fan and optional electric heater controls 29. The fan control 28 controls fan 30 and the optional auxiliary heater 29 controls the optional auxiliary electric heater (not shown). The heater is positioned over the fan blades as an auxiliary heat source if the capacity of the unit drops below the heating requirement of the structure. Also shown in this view are the illustrative locations of electrical ports 34 and low voltage ports 32 located on bulkhead 22. These electrical ports receive and send electrical commands between an external wall thermostat (not shown) and all electrical components module 4, 6, and 8. The side and end elevation views shown in FIGS. 24-26 show fan 30 attached to ceiling 110 of module 4. In this configuration, air can be drawn from any of the other sides or the bottom of module 4 and then directed upward to another module in direction 90. These views further show line 112 that electrically connects fan controls 28 to fan 30.

Figure 27:
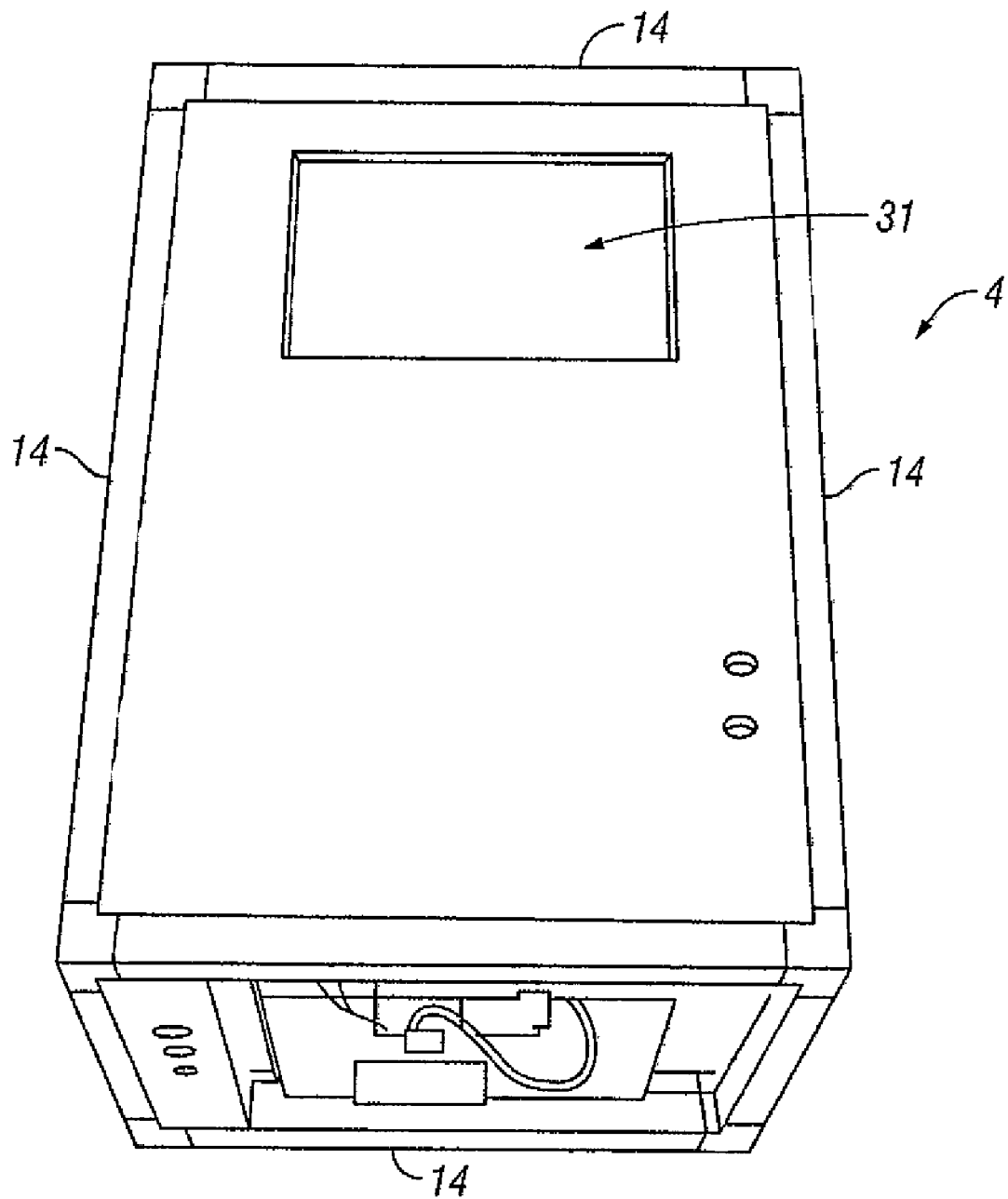
FIGS. 27 and 28 show the top and bottom of the fan module.
Figure 28:
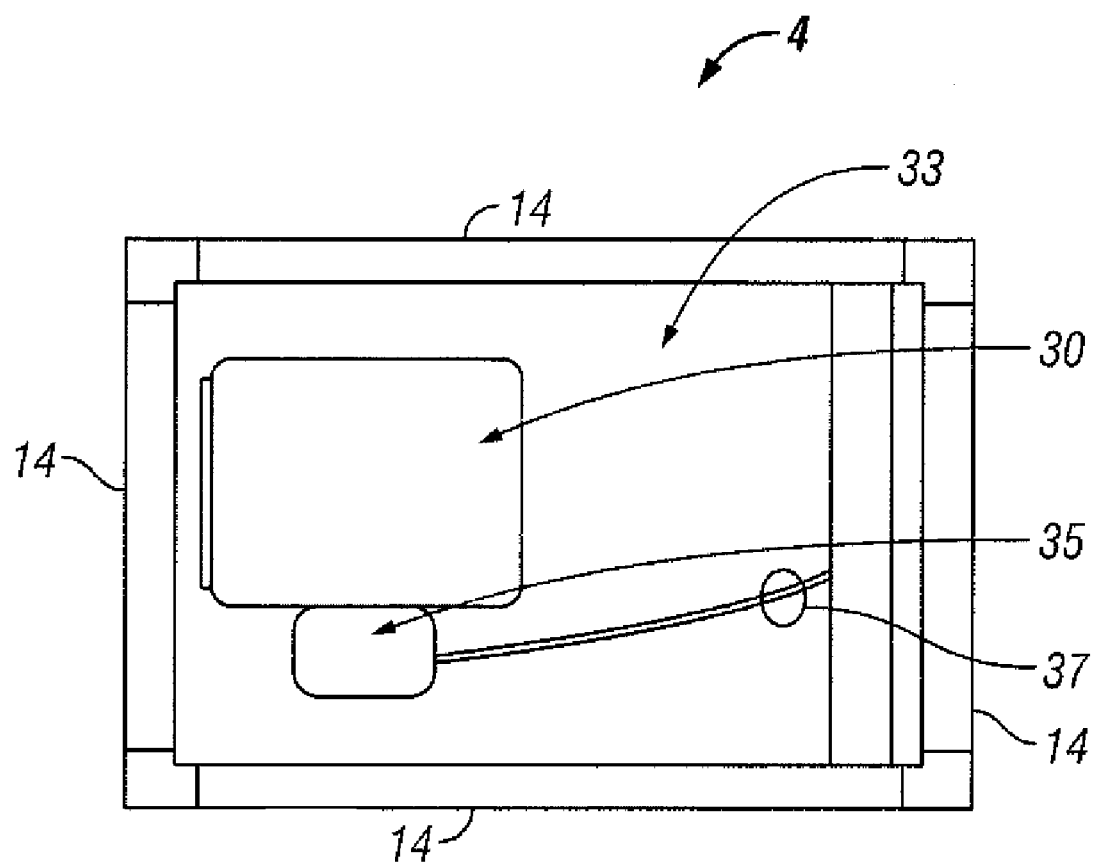
Figure 29:
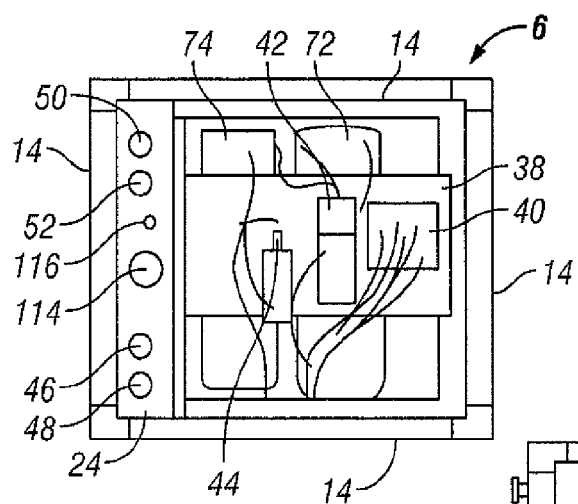
FIGS. 29-32 are elevation views showing the four sides of an illustrative compressor module.

Top and bottom views of fan module 4 are shown in FIGS. 27 and 28, respectively. Frame members 14 are connected to form the footprint of the module. As shown in FIG. 27, top opening 31 is illustratively configured to mate with chute 70 on one side of compressor module 6. Conversely, as shown in FIG. 28, bottom opening 33 receives air from the exterior of module 4 and drawn up from fan blower 30. This view also shows fan motor 35 and wiring 37.

Elevation views showing the four sides of compressor module 6 are shown in FIGS. 29-32. The elevation view shown in FIG. 29 includes module 6 illustratively encased by frame members 14. Inside, control panel 38 supports low voltage circuit board 40, capacitor 42, and contactor 44. Bulkhead 24 is also shown providing the service ports to and from the other modules, such as the optional domestic hot water assist/desuperheater heat exchanger, inlet 48, and outlet 50, refrigerant port 114 that receives refrigerant line 136, refrigerant port 116 that receives refrigerant line 130, another inlet 52 and outlet 46 for the liquid-to-refrigerant heat exchanger 72. The purpose of the multiple inlet and outlet ports is so that ground water or liquid pumped through the geothermal loop piping can be circulated into and out of the liquid-to-refrigerant heat exchanger 72, as well as between the optional domestic hot water source and the hot water assist exchanger 141. (See also FIG. 31.)

Figure 30:
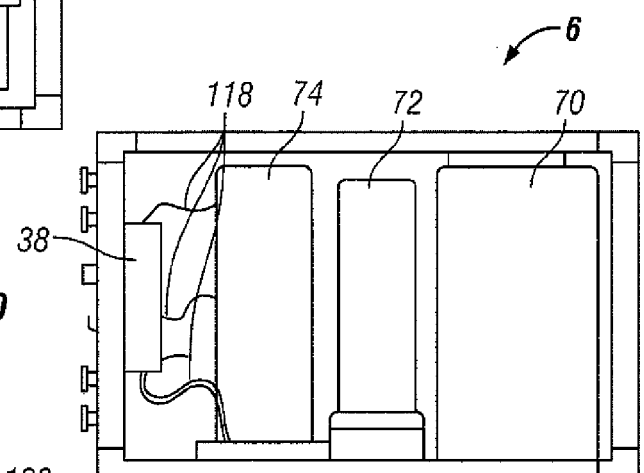
Figure 31:
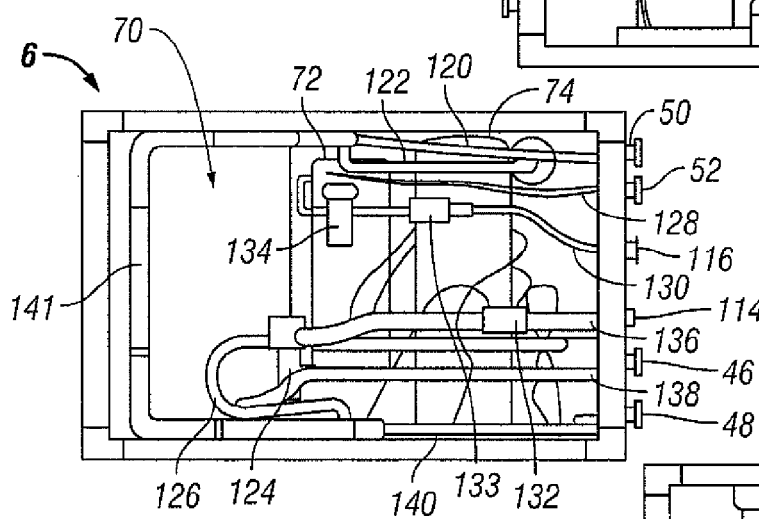
Figure 32:
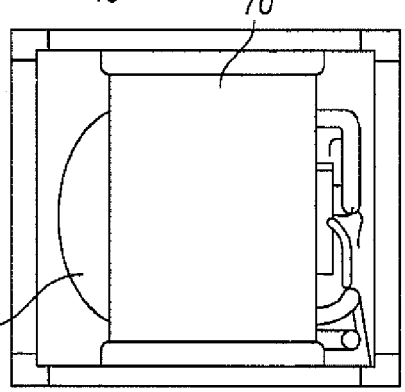

The side view shown in FIG. 30, similar to the view shown in FIG. 3, depicts chute 70, liquid-to-refrigerant heat exchanger 72, and compressor 74. Control lines 118 control compressor 74 via control panel 38 so liquid-to-refrigerant heat exchanger 72 transfers heat between the liquid and the refrigerant. The positioning of water/refrigerant heat exchanger 72 and compressor 74 is tight to accommodate chute 70 extending through this module. Air passing through chute 70 is being conveyed from the home or structure and back into the home or structure after being heated or cooled by the water source geothermal heat pump unit. This air passing inside and through chute 70 is isolated from any other medium or components inside compressor module 6. It is appreciated that air flow can be transferred from one end of the chute 70 to the other. (See also FIGS. 33 and 34.) The view shown in FIG. 31 includes the several lines that run from the ports on bulkhead 24. For example, optional domestic hot water line 120 extends from port 50 illustratively back around towards the rear of module 6 into optional domestic hot water assist heat exchanger 141, interfaces with refrigerant line 122 and refrigerant reversing valve 124 via line 126. Liquid line 128 receiving fluid from port 52 extends to liquid-to-refrigerant heat exchanger 72 transferring energy into the refrigerant. Refrigerant line 130 extends from port 116, passing through a refrigerant service valve 133 and a refrigerant expansion valve 134, and ending at liquid-to-refrigerant heat exchanger 72 which transfers energy from the ground water or liquid from the ground loop into refrigerant during heating, and transfers energy from the refrigerant into the ground water or ground loop during cooling. Similarly, refrigerant line 136 extending from port 114 runs to refrigerant service valve 132 and into refrigerant reversing valve 124, which directs the refrigerant to the proper heating or cooling cycle. A water line runs from port 46 and into water/refrigerant heat exchanger 72. Line 140 runs from port 48 and also into the optional domestic hot water heat exchanger 141, which exchanges temperature from the refrigerant into optional domestic hot water assist heat exchanger 141. Lastly, a rear elevation view of compressor module 6 is shown in FIG. 32. This view shows chute 70 extending from one end of module 6 to the other.

Figure 33:
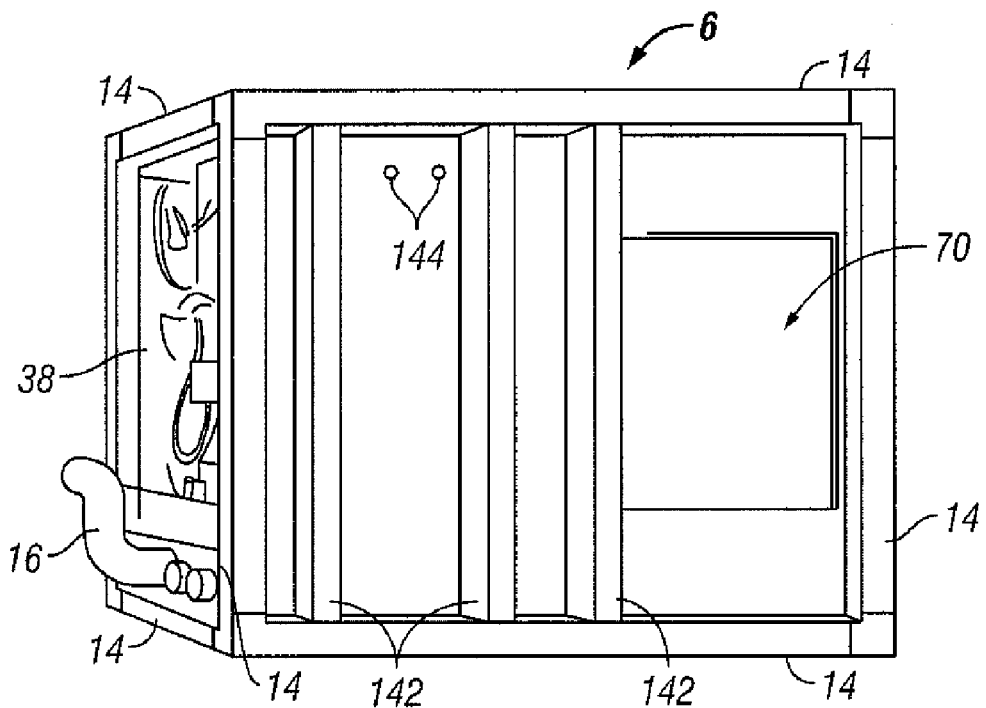
FIGS. 33 and 34 are top and bottom views of an illustrative compressor section.
Figure 34:
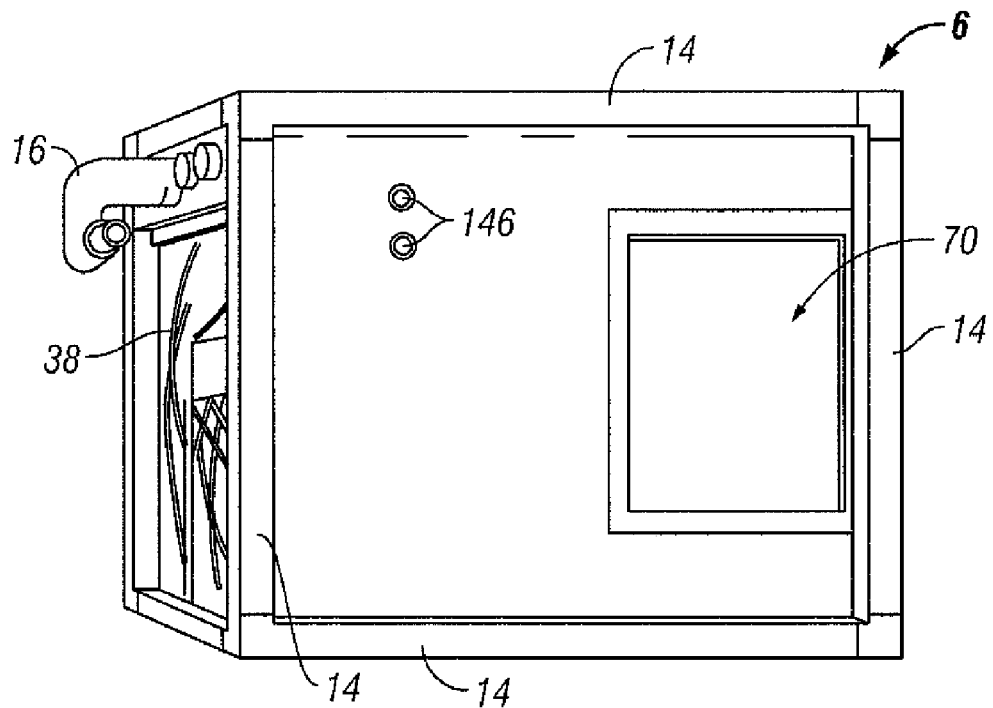

FIGS. 33 and 34 show bottom and top views of compressor module 6 respectively. In this illustrative embodiment, frame members 14 are connected to form the footprint of the module. Braces 142 span the bottom of module 6 between opposing frame members 14 to provide additional support of the contents inside. Chute 70 is also shown in these views. It is appreciated that fan 30 can be placed in module 4 to align with chute 70 from the bottom side, as shown in FIG. 33. Conversely, the air flow generated from fan 30 is pushed through chute 70 exiting from the top side of module 6 to supply air flow through coil module 8. Location of chute 70 and fan 30 should be considered along with the function of the module. Proper alignment between chute 70 and the other module allows smooth flow of air at high velocities. Any misalignment generates air friction. This friction may create inefficient fan usage, as well as audible noise. Also shown in this view are electrical openings 144 and 146 which allow electrical lines to run between the modules.

Figure 39:
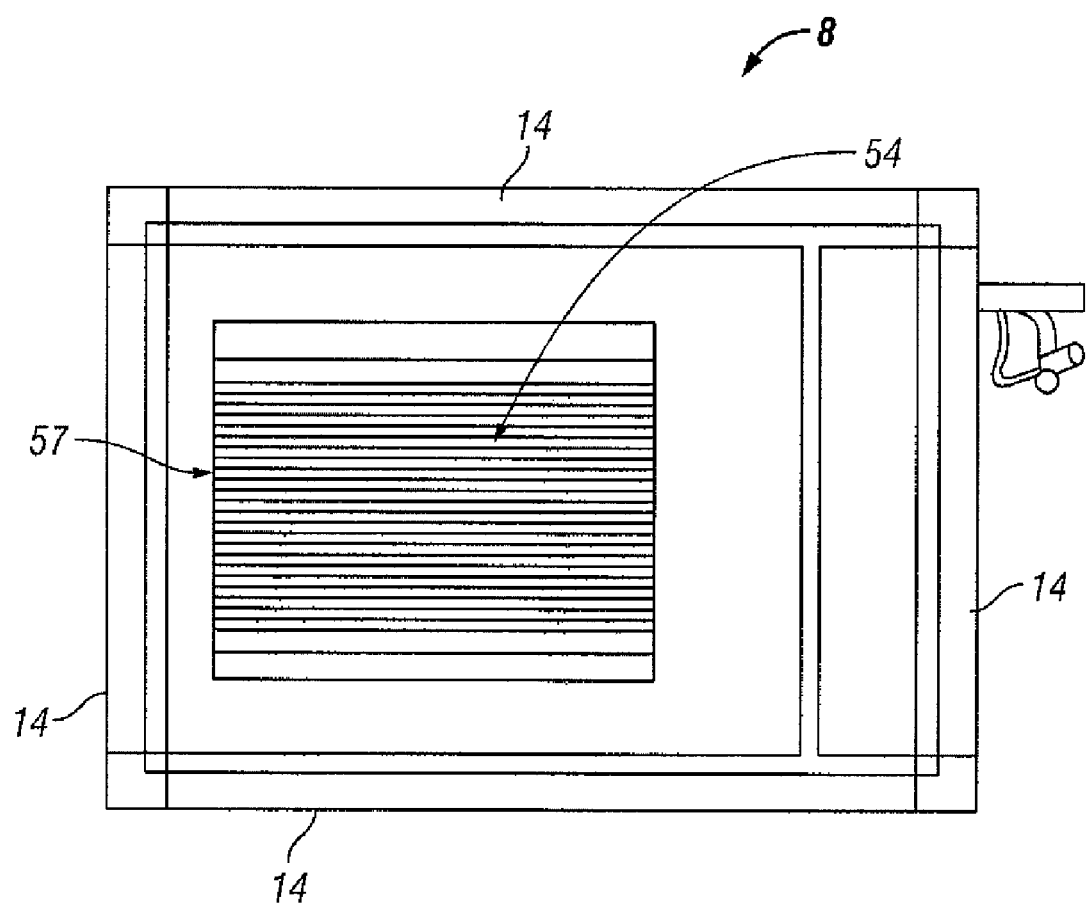
FIG. 39 is a bottom view of the coil module.

Elevation views showing the four sides of coil module 8 are shown in FIGS. 35-39. As shown in FIG. 35, again frames 14 illustratively supply the support structure to the module. It is appreciated, however, that in alternative embodiments, frameless panels having sufficient rigidity may be used instead of actual frame members. It is also appreciated that wall panels can be attached to frame members 14 to shroud the internal components. This view shows bulkhead 26 with refrigerant port 146 that receives refrigerant from refrigerant line 20 and port 148 that receives refrigerant from line 16. (See also FIG. 2.) The refrigerant from line 20 and into port 146 is distributed through line 150 and into refrigerant distributors 158. Refrigerant fluid from line 16 (see also FIG. 2) entering port 148 is distributed up through line 160 and into manifold 64, which evenly distributes the flow of refrigerant to air coil 62. Refrigerant is distributed to coils 162 formed in A-frame coil 54. Air is configured to pass directly from fan module 4 through compressor module 6, and over coils 162 of A-frame coil 54. This is what transfers heat into or out of the flowing air and up through the ducting (not shown) to be distributed throughout the home or structure. As previously discussed, condensate upflow and downflow trays 56 and 58 are illustratively located at the end of coil 54 to collect any condensate that collects on the coil. As previously discussed with respect to FIG. 15, if the A-frame coil 54 is oriented in the direction shown in FIGS. 36-38, condensate will collect from coils 162 onto tray 58. Conversely, if A-frame coil 54 is rotated, then the condensate will collect in tray 56. It is also appreciated that A-frame coil 54 configuration is used to provide more surface area for the moving air to pass over to be heated or cooled before entering the ducting and distributed thereafter. A bottom view of coil module 8 is shown in FIG. 39. This view shows opening 57 that is in communication with chute 70 in compressor module 6 and coil 54. Air passes though chute 70 and into the interior of module 8. The air passes across coil 54 which heats or cools before it exits module 8.

Figure 40:
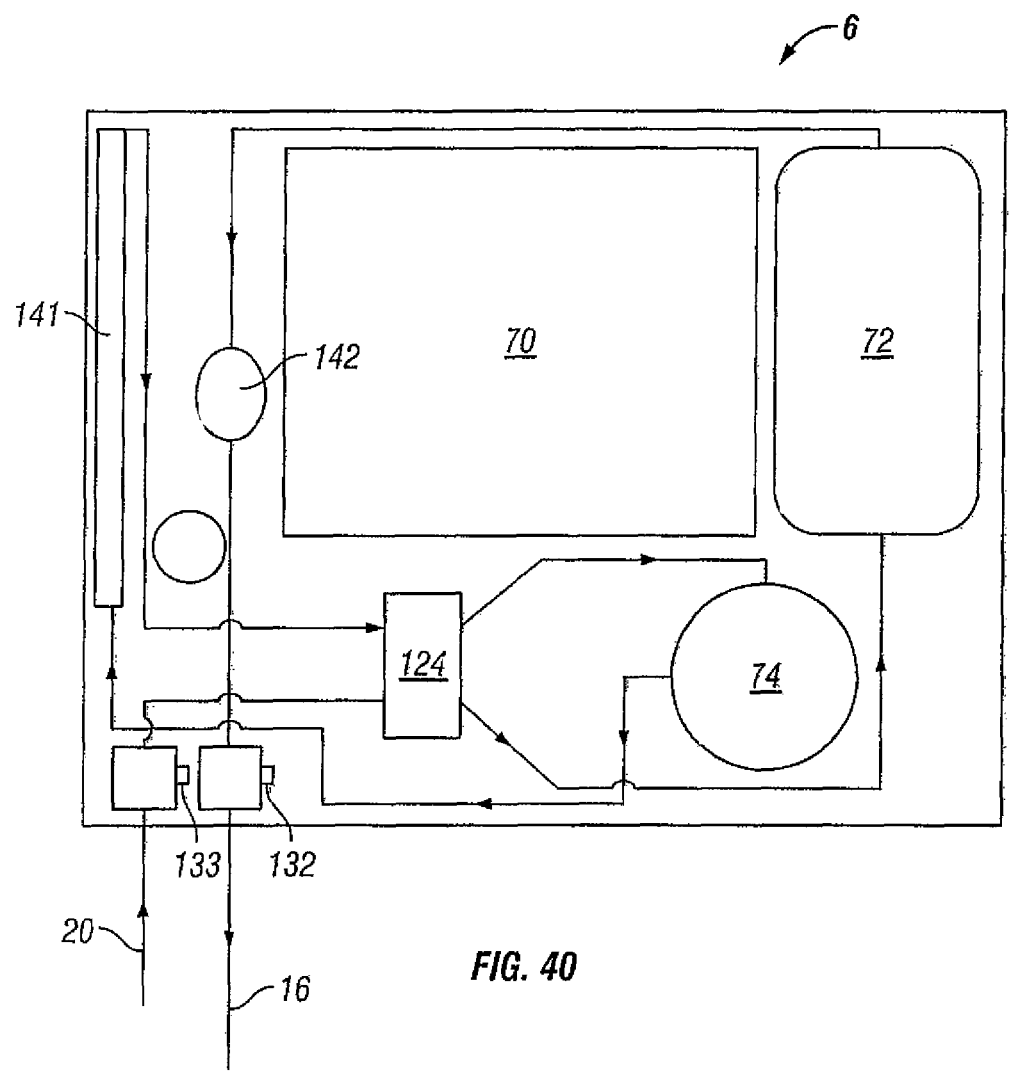
FIG. 40 is a schematic view of the internal components of an illustrative compressor module during a cooling cycle.
Figure 41:
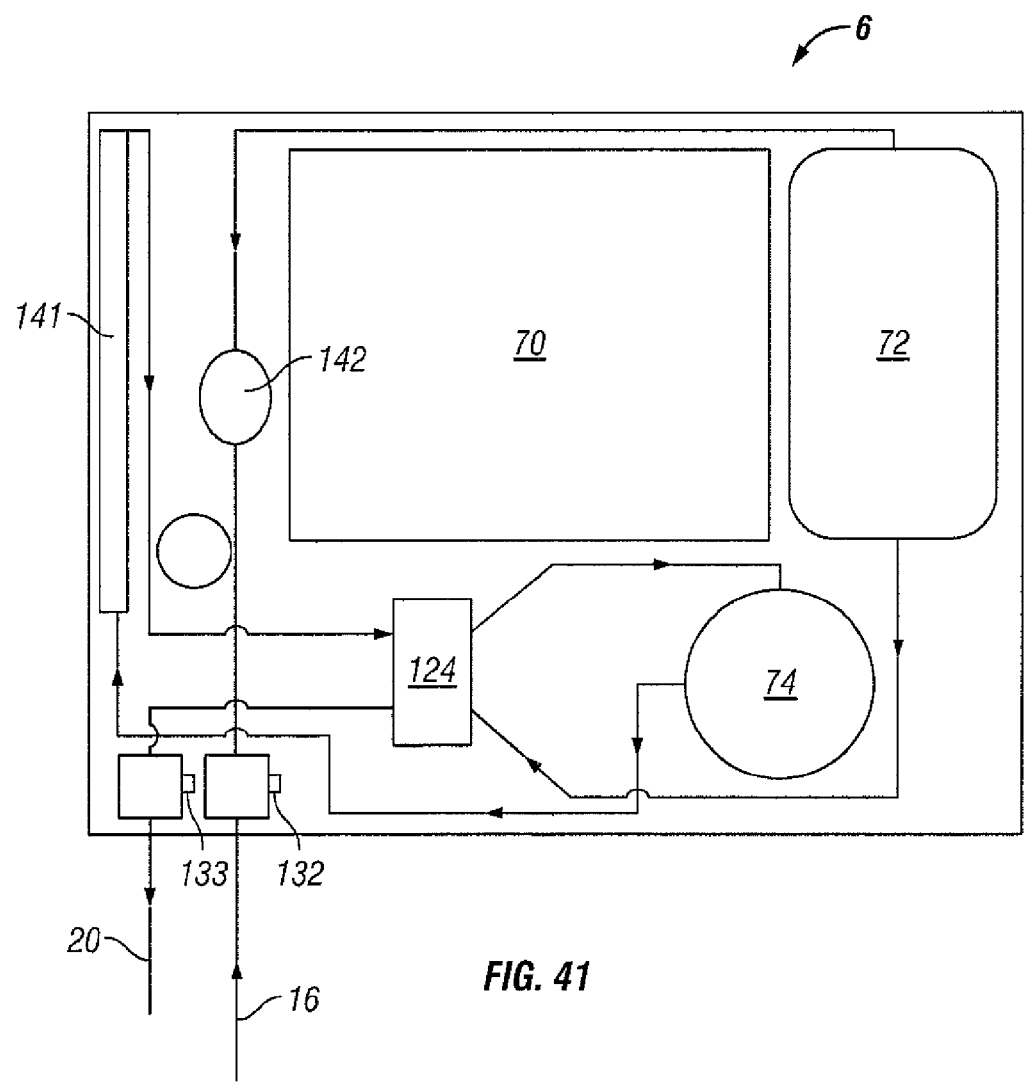
FIG. 41 is another schematic view of the illustrative compressor module during a heating cycle.
Figure 42:
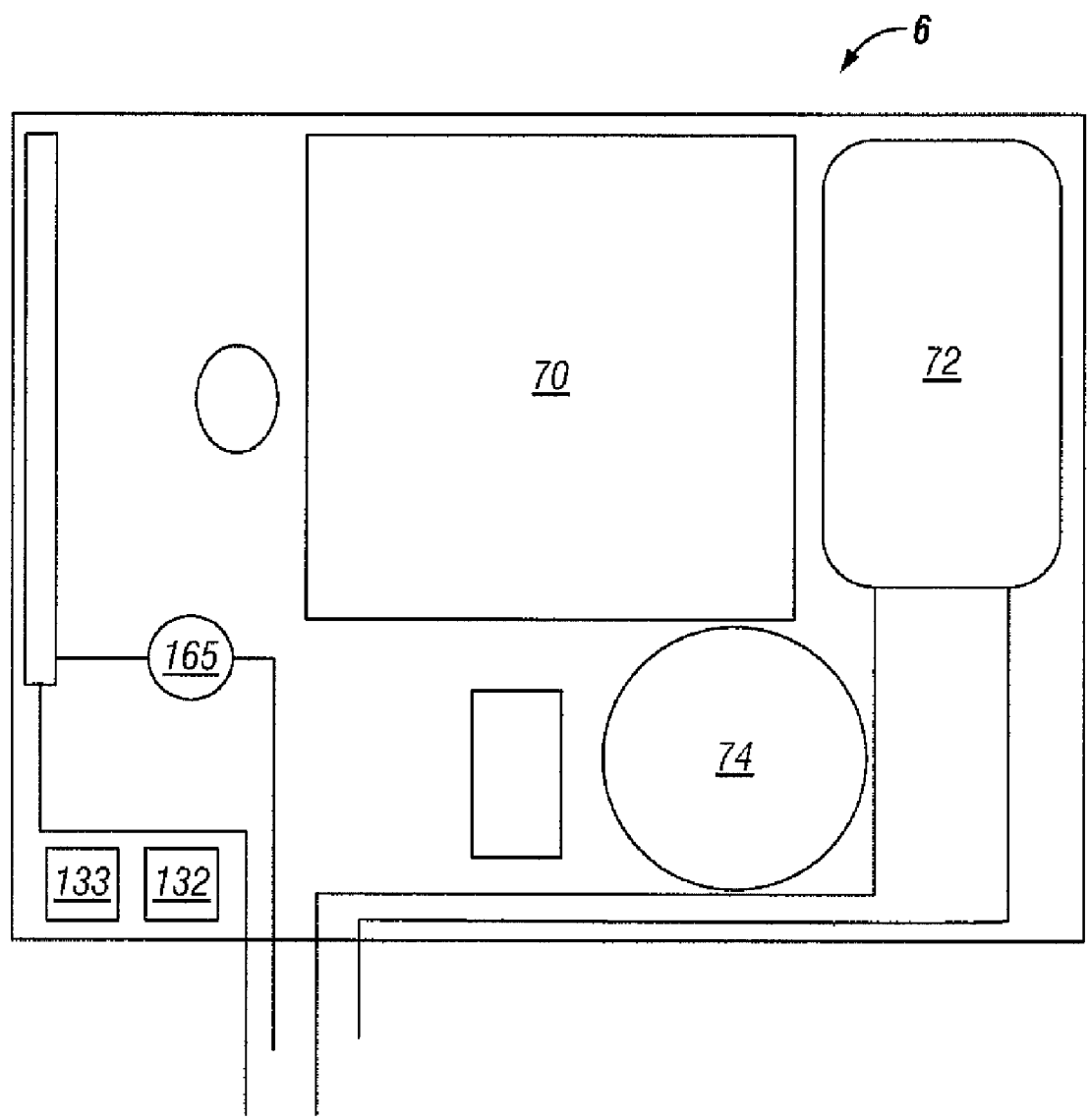
FIG. 42 is another schematic view of the illustrative compressor module showing the water circuit.
Figure 43:
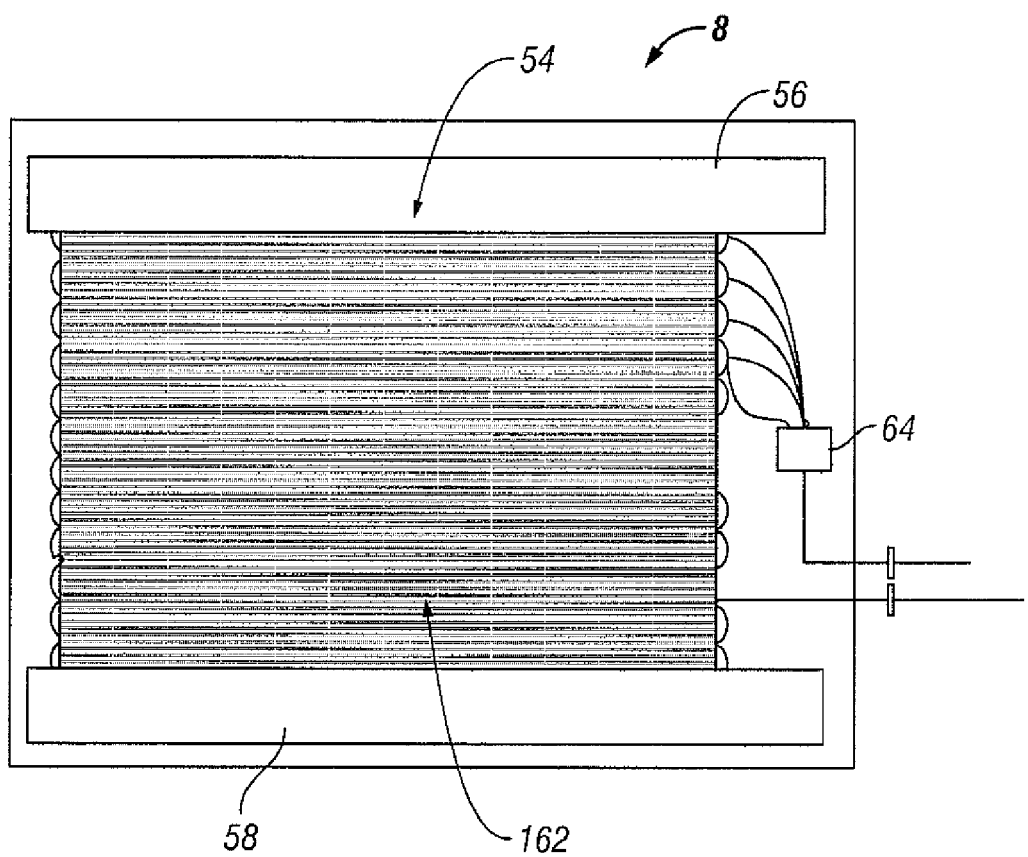
FIG. 43 is a side schematic view of the coil module.

Schematic views of compressor module 6 depicting the cooling, heating, and water circuit cycles are provided in FIGS. 40-42. During the cooling cycle, as shown in FIG. 40, refrigerant is compressed and circulated by compressor 74. Refrigerant leaves compressor 74 and travels directly to the optional domestic hot water coil 141. This optional domestic hot assist water coil is illustratively a commercially available coaxial heat exchanger with a vented double wall, so if a leak occurs the escaping refrigerant is vented rather than introduced into the domestic water system. In the optional domestic hot water assist heat exchanger 141, some heat can be extracted from the refrigerant to supplement domestic hot water needs.

The refrigerant then travels to reversing valve 124 which is used to change the direction of flow for heating or cooling cycles. In this cooling mode, the refrigerant is directed to the liquid-to-refrigerant heat exchanger 72 where source liquid in the liquid-to-refrigerant coil absorbs the heat from the refrigerant. Refrigerant then travels to metering device 142 (also called an expansion valve) to the refrigeration valve 132, and then to air coil 54 where the refrigerant absorbs heat from the air flow generated by fan 30 cooling the air.

The refrigerant, now warm, travels back through the refrigeration valve 133 then to reversing valve 124. At reversing valve 124, the refrigerant is directed back to the compressor.

Conversely, during the heating cycle, as shown in FIG. 41, refrigerant is compressed and circulated by compressor 74. Refrigerant leaves compressor 74 and travels directly to the optional domestic hot water coil 141. In the domestic water heat exchanger 141, some heat is extracted from the refrigerant to supplement domestic hot water needs.

The refrigerant then travels to reversing valve 124. The reversing valve 124 changes the direction of flow to heating. During this heating cycle, refrigerant is directed from the reversing valve to the refrigeration valve and the service valve 133 and then to air coil 54. In the air coil 54, heat is extracted from the refrigerant by the air blown over coil 54 by the blower wheel turned by the fan motor 30. The air is heated by absorbing the heat from the refrigerant. Cooled refrigerant then travels from the air coil 54 to the refrigeration valve 132 then to the metering device 142, which determines the amount of refrigerant flow through the system. The refrigerant then travels to the liquid-to-refrigerant heat exchanger 72 and absorbs heat circulated through the system from the source liquid. The refrigerant then travels back to the reversing valve 124 and continues to the compressor where the circuit is now complete.

An illustrative schematic of a water circuit is shown in FIG. 42. As illustratively shown, water (or loop fluid) enters the liquid-to-refrigerant heat exchanger and heat exchange takes place between the fluid and the refrigerant. Heat is either absorbed by the refrigerant in heating, or rejected from the refrigerant in cooling. Heat is also exchanged in the optional domestic hot water exchanger 141. An optional domestic hot water pump 165, controlled by a high temperature limit switch, circulates domestic water to and from a domestic hot water heater or storage tank (not shown). The heat exchanger is a vented double wall heat exchanger suitable for portable water.

Figure 44:
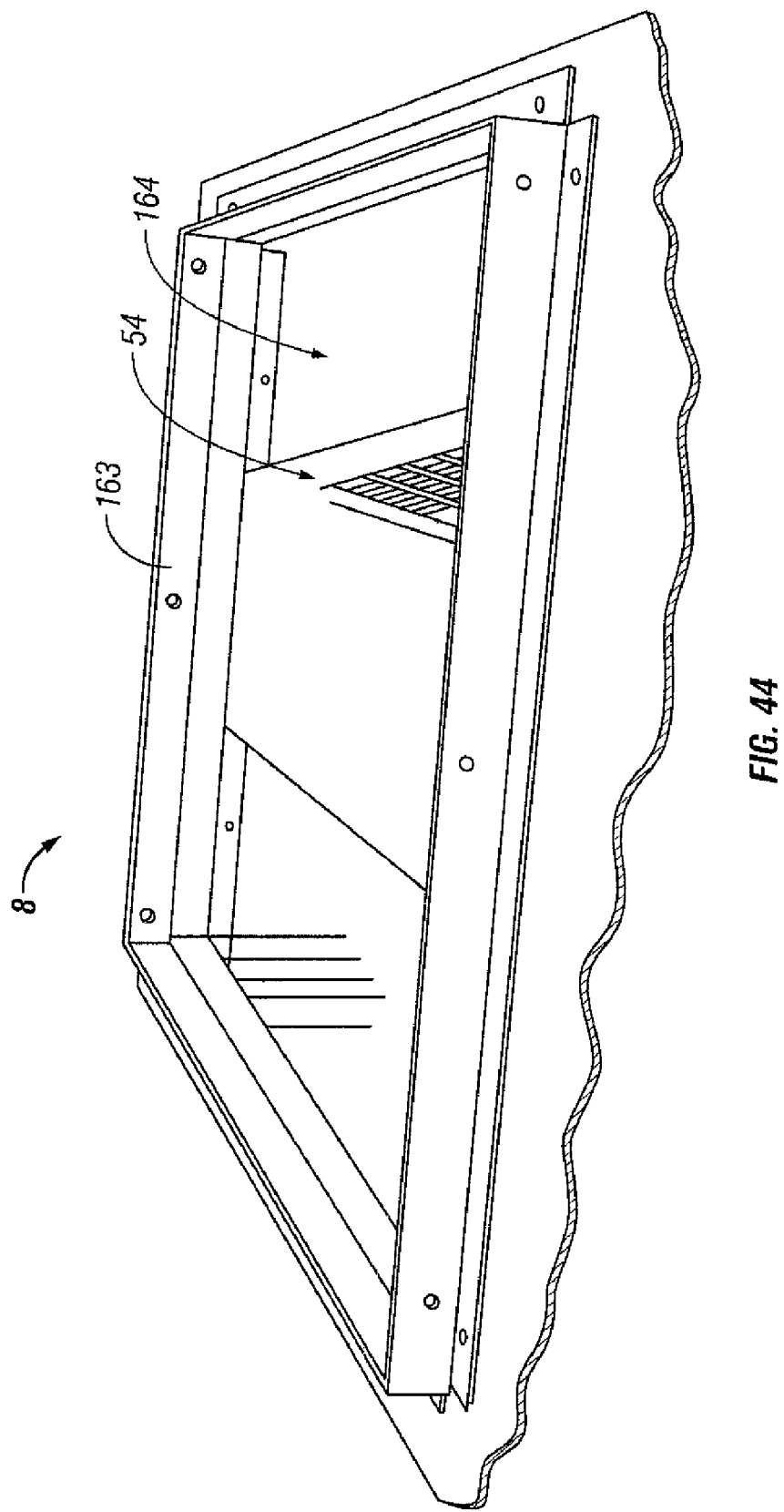
FIG. 44 is a top perspective view of a portion of an illustrative coil module showing an illustrative frame that can be used to connect to ducting.

A top perspective view of a portion of coil module 8, showing an illustrative connection frame 163, is shown in FIG. 44. In this illustrative embodiment, A-frame coil 54, cools or heats the flowing air which exits through opening 164 and is distributed through duct work (not shown) that is attached to frame 163. It is appreciated that other frames or even no frame at all can be used depending on the particular duct work that is connected to the geothermal unit.

Figure 45:
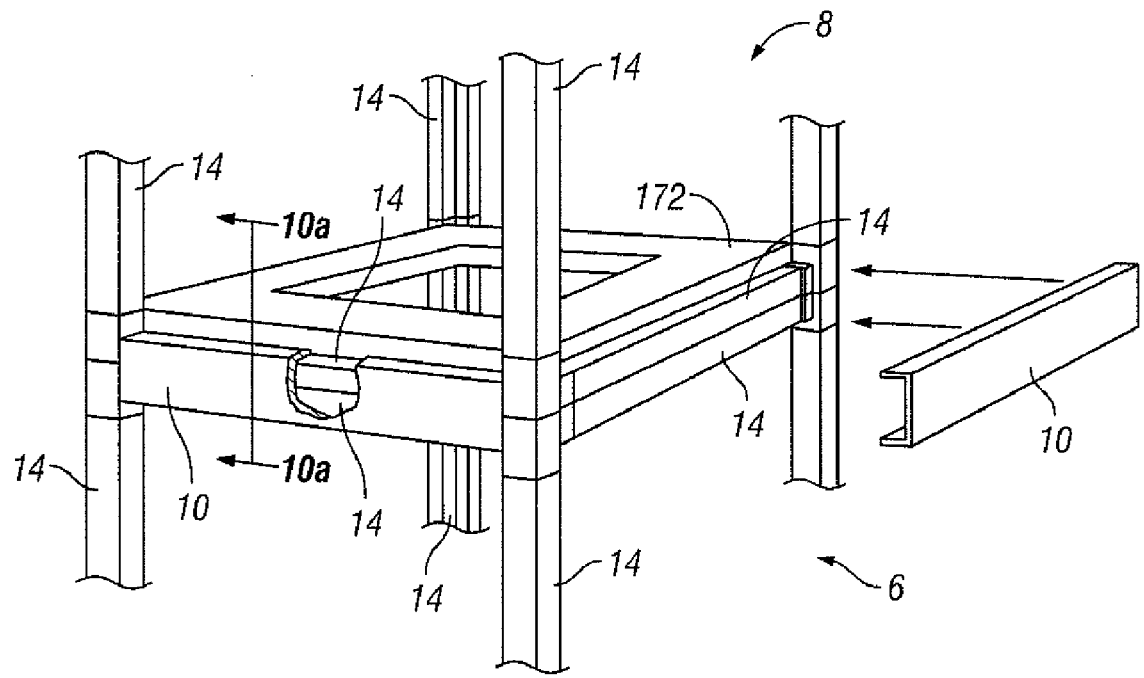
FIGS. 45 and 46 are partially exploded perspective and side cross-sectional views of coil and compressor modules demonstrating how they can illustratively be connected to one another.
Figure 46:
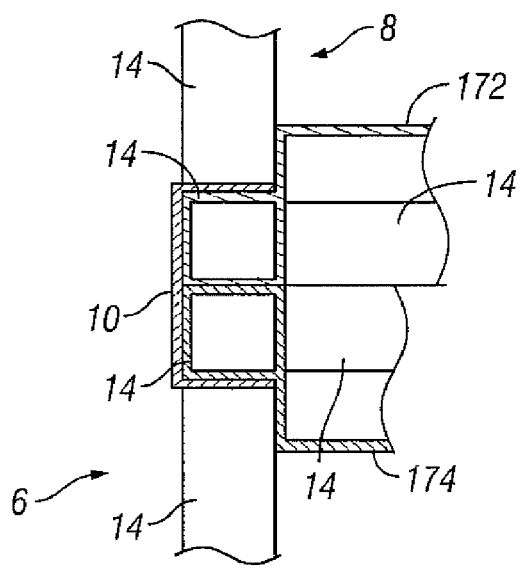

Partially exploded perspective and detail side cross-sectional views of a portion of compressor module 6 and coil module 8 are shown in FIGS. 45 and 46. These views demonstrate an illustrative embodiment of the mechanism for securing the modules together. In this illustrative embodiment, a binder clip 10 illustratively attaches to frames 14 from each module 6 and 8, coupling those modules together. In this illustrative embodiment, flooring 172 and ceiling 174 are each recessed leaving three sides of frames 14 exposed. This allows clip 10, which is illustratively c-shaped, to clamp over two frames 14 placed together. It is appreciated that the clips shown can be replaced with fasteners extending through the two modules coupling them together. It is appreciated that these modular framing techniques can be replaced by a singular or modular sheet metal processes with modular capabilities designed to fit together with the same external modular effects as those described.

Figure 48:
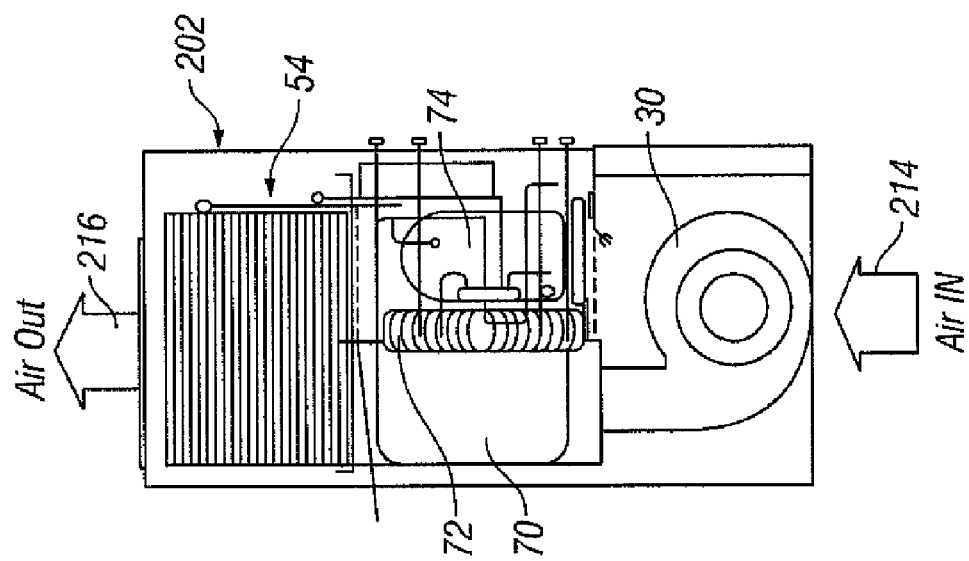
FIGS. 47 and 48 are side elevation views of illustrative embodiments of a monolithic water source geothermal heat pump that does not employ separate modules.
Figure 47:
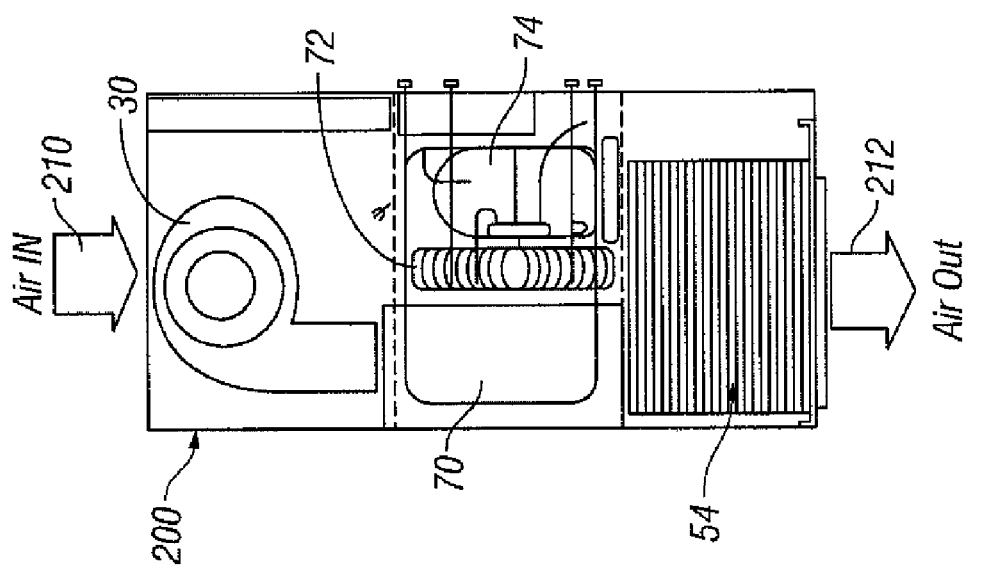

Elevation views of additional embodiments of water source geothermal unit 200 and 202 are shown in FIGS. 47 and 48, respectively. Similar to prior embodiments, both units 200 and 202 include a fan 30, coil 54, duct 70, heat exchanger 72, and compressor 74 located between fan 30 and coil 54. Many of the other water source geothermal components previously discussed are also in these units. Where units 200 and 202 differ, however, is they are not composed of separate modules. These are monolithic units that do not have framing separating the fan, compressor and coil sections that are removable and reattachable to change configurations. These units 200 and 202 can employ framing to the extent needed to define the shape of the unit and to house the components. Unit 200 is distinguished from unit 202 in that air flow enters at the top as indicated by reference number 210 and exits out from the bottom as indicated by reference number 212. Conversely, unit 202 passes the air in from the bottom, indicated by reference number 214, and exits out of the top as indicated by reference number 216. As shown, the internal components are still compact and arranged similar to that shown in modules 4, 6, and 8, providing the sized unit necessary to be a suitable replacement for a conventional gas furnace. In this case, however, these units 200 and 202 are standard configured to fit in many currently configured mechanical spaces.

What is claimed is:

1. A water source geothermal unit comprising:
an enclosure having a first opening configured to receive air;
a second opening axially opposed to and distal from the first opening to exhaust air;
a fan located adjacent the first opening;
wherein the fan draws air and moves air from the first opening, and directs the air toward the second opening;
a compressor that receives evaporated refrigerant from a liquid-to-refrigerant heat exchange coil;
wherein the compressor is configured to compress the evaporated refrigerant from the liquid-to-refrigerant heat exchange coil creating heated refrigerant during the heating cycle, and the compressor circuit creating chilled refrigerant during the cooling cycle;
a coil located adjacent the second opening; and
a chute located adjacent the compressor and between the fan and the coil;
wherein the coil receives and circulates the heated or chilled refrigerant;
wherein moving air from the fan passes through the chute, around the coil and exhausts from the second opening.

2. The water source geothermal unit of claim 1, wherein the coil is an A-frame coil.

\* \* \* \* \*